(12) United States Patent
Abe et al.

(10) Patent No.: US 7,092,030 B1
(45) Date of Patent: Aug. 15, 2006

(54) IMAGE PICKUP APPARATUS WITH PRISM OPTICAL SYSTEM

(75) Inventors: Takeshi Abe, Yokohama (JP); Kazuhiko Kawase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/143,468

(22) Filed: Aug. 27, 1998

(30) Foreign Application Priority Data

Sep. 3, 1997 (JP) .................................. 9-238286
Dec. 25, 1997 (JP) .................................. 9-366226

(51) Int. Cl.
*H04N 5/225* (2006.01)
*G02B 13/16* (2006.01)
*G03B 13/02* (2006.01)
*G03B 17/02* (2006.01)

(52) U.S. Cl. ...................... 348/374; 348/335; 348/344; 396/374; 396/535

(58) Field of Classification Search ................ 348/335, 348/337, 338, 340, 341, 333.01, 333.09, 348/345, 374, 233, 344, 357, 372, 373; 396/375, 396/386, 379, 384, 374; D16/220, 216
See application file for complete search history.

(56) References Cited

U.S. PATENT DOCUMENTS

| | | | | |
|---|---|---|---|---|
| 4,525,744 A | * | 6/1985 | Nakamura et al. | ........... 348/341 |
| 5,179,478 A | * | 1/1993 | Aoki | ........................... 386/118 |
| 5,724,616 A | * | 3/1998 | Imafuji et al. | ................. 396/55 |
| 5,742,339 A | * | 4/1998 | Wakui | ...................... 348/231.9 |
| 5,822,001 A | * | 10/1998 | Morikawa et al. | ........... 348/375 |
| 5,936,668 A | * | 8/1999 | Sawanobori et al. | ... 348/333.01 |
| 6,008,845 A | * | 12/1999 | Ohyoshi | ...................... 348/360 |
| 6,041,195 A | * | 3/2000 | Honda et al. | ................ 396/386 |
| 6,130,994 A | * | 10/2000 | Maruyama | ................... 396/60 |
| 6,169,578 B1 | * | 1/2001 | Chigira | ........................ 348/347 |
| 6,188,432 B1 | * | 2/2001 | Ejima | .......................... 348/240 |
| 6,224,227 B1 | * | 5/2001 | Klootz | ........................ 362/105 |
| 6,225,614 B1 | * | 5/2001 | Ono | ......................... 250/201.5 |
| 6,233,014 B1 | * | 5/2001 | Ochi et al. | ................... 348/324 |
| 6,453,125 B1 | * | 9/2002 | Shono | ......................... 396/287 |
| 6,459,857 B1 | * | 10/2002 | Kawamura et al. | ......... 396/374 |
| 6,535,250 B1 | * | 3/2003 | Okisu et al. | ................. 348/345 |
| 6,809,772 B1 | * | 10/2004 | Motta et al. | ................ 348/341 |

(Continued)

FOREIGN PATENT DOCUMENTS

JP          57181273 A     *    8/1982

(Continued)

*Primary Examiner*—Tuan Ho
*Assistant Examiner*—John M. Villecco
(74) *Attorney, Agent, or Firm*—Cowan, Liebowitz & Latman, P.C.

(57) ABSTRACT

An image pickup apparatus includes an image pickup apparatus body, an image recording/reproducing section placed on the right-hand side within the image pickup apparatus body when viewed in a photographing direction, an image-displaying monitor disposed on the left-hand side within the image pickup apparatus body when viewed in the photographing direction, and a power-supplying battery located on a side surface of the image pickup apparatus body. In addition, an optical system of a viewfinder which is detachably attachable to the image pickup apparatus body includes a first reflecting mirror disposed on a display screen at an angle of 45 degrees or less with respect to the display screen, a second reflecting mirror disposed in parallel to the first reflecting mirror for reflecting a light beam from the first reflecting mirror in a direction parallel to light incident on the first reflecting mirror, and negative and positive lenses for leading a light beam from the second reflecting mirror to an eye of the photographer.

8 Claims, 30 Drawing Sheets

U.S. PATENT DOCUMENTS

| | | | |
|---|---|---|---|
| 6,856,766 B1* | 2/2005 | Suzuki | 396/535 |
| 6,992,724 B1* | 1/2006 | Yamaguchi | 348/374 |
| 2001/0015760 A1* | 8/2001 | Fellegara et al. | 348/333.01 |
| 2002/0159774 A1* | 10/2002 | Koyama et al. | 396/505 |
| 2004/0080656 A1* | 4/2004 | Higuchi et al. | 348/335 |
| 2004/0109076 A1* | 6/2004 | Yokota et al. | 348/335 |
| 2004/0135915 A1* | 7/2004 | Ueda et al. | 348/335 |
| 2004/0136093 A1* | 7/2004 | Nishioka et al. | 359/726 |
| 2005/0036056 A1* | 2/2005 | Ikemachi et al. | 348/335 |
| 2006/0001759 A1* | 1/2006 | Raschke | 348/335 |
| 2006/0017834 A1* | 1/2006 | Konno et al. | 348/335 |

FOREIGN PATENT DOCUMENTS

| | | | |
|---|---|---|---|
| JP | 01292321 A | * | 11/1989 |
| JP | 01-314227 | | 12/1989 |
| JP | 02-259738 | | 12/1990 |
| JP | 04-114568 | | 4/1992 |
| JP | 05-022641 | | 1/1993 |
| JP | 05-037832 | | 2/1993 |
| JP | 06205251 A | * | 7/1994 |
| JP | 07-168096 | | 7/1995 |
| JP | 07270767 A | * | 10/1995 |
| JP | 08-032841 | | 2/1996 |
| JP | 08130666 A | * | 5/1996 |
| JP | 08-149347 | | 6/1996 |
| JP | 08-223459 | | 8/1996 |
| JP | 08-278448 | | 10/1996 |
| JP | 09-093468 | | 4/1997 |
| JP | 09-163206 | | 6/1997 |
| JP | 09163196 A | * | 6/1997 |
| JP | 2000295511 A | * | 10/2000 |
| WO | WO97/49003 | | 12/1997 |

* cited by examiner

TOP VIEW

SIDE VIEW

FRONT VIEW

BOTTOM VIEW

FIG. 2A
FIG. 2B
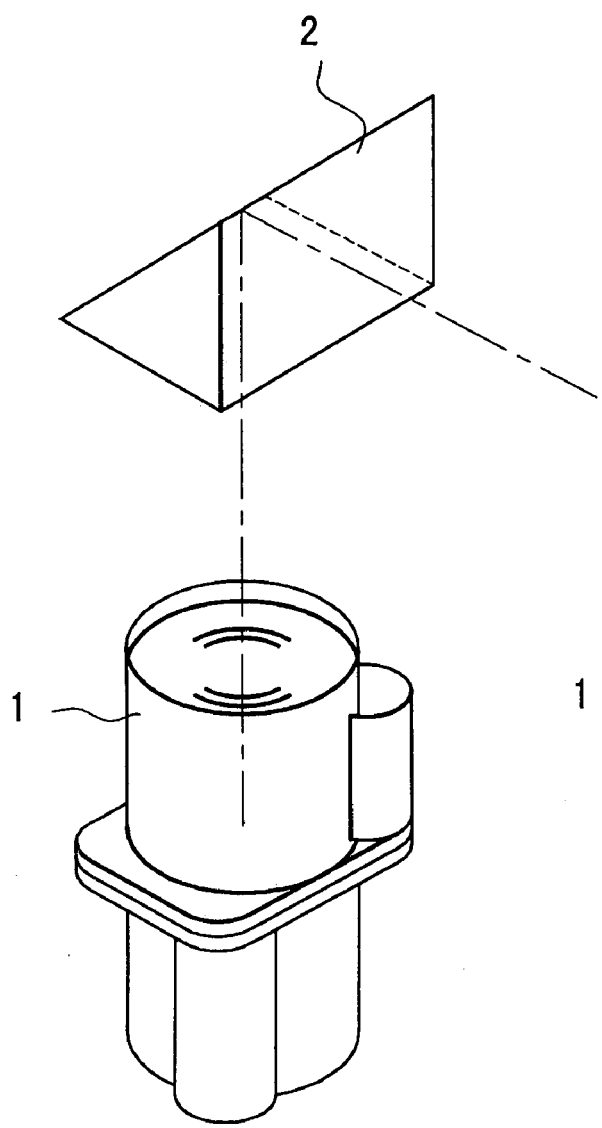
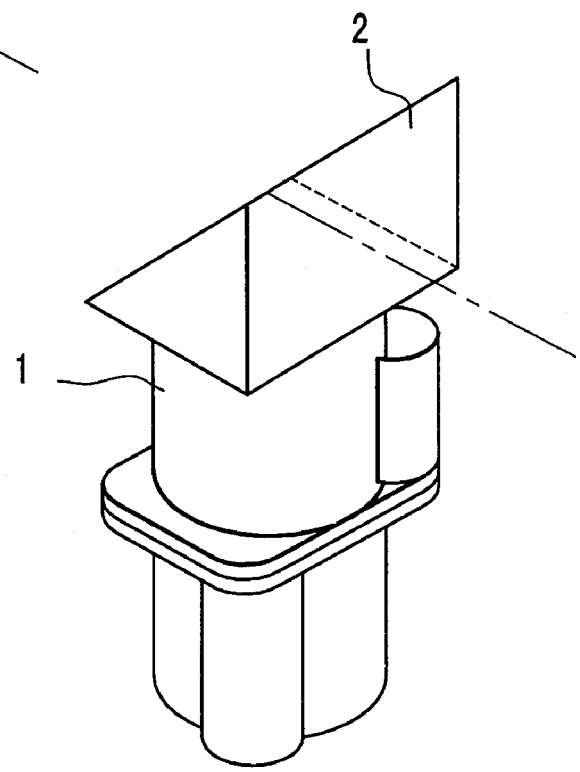

SIDE VIEW

FRONT VIEW

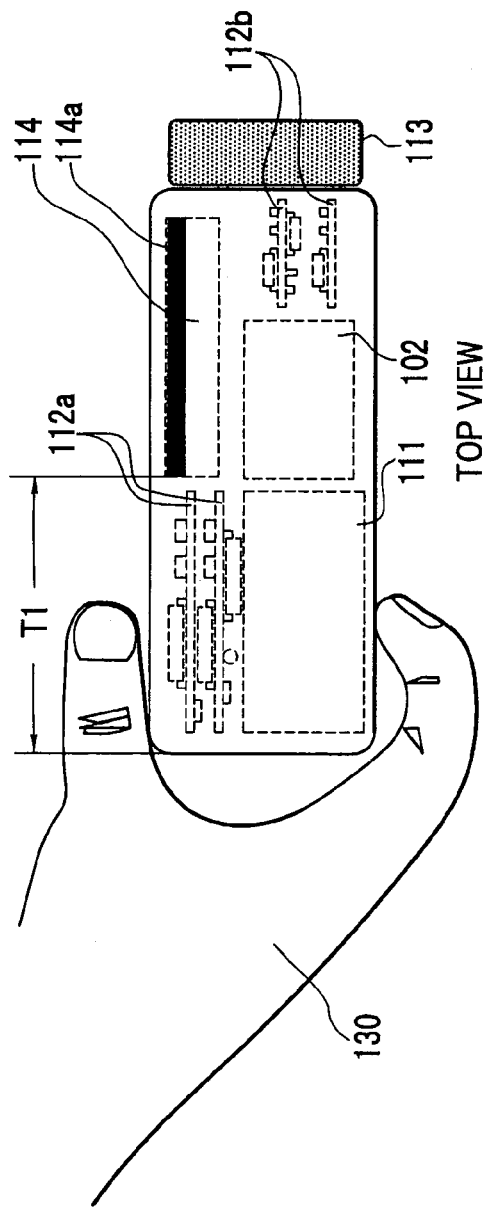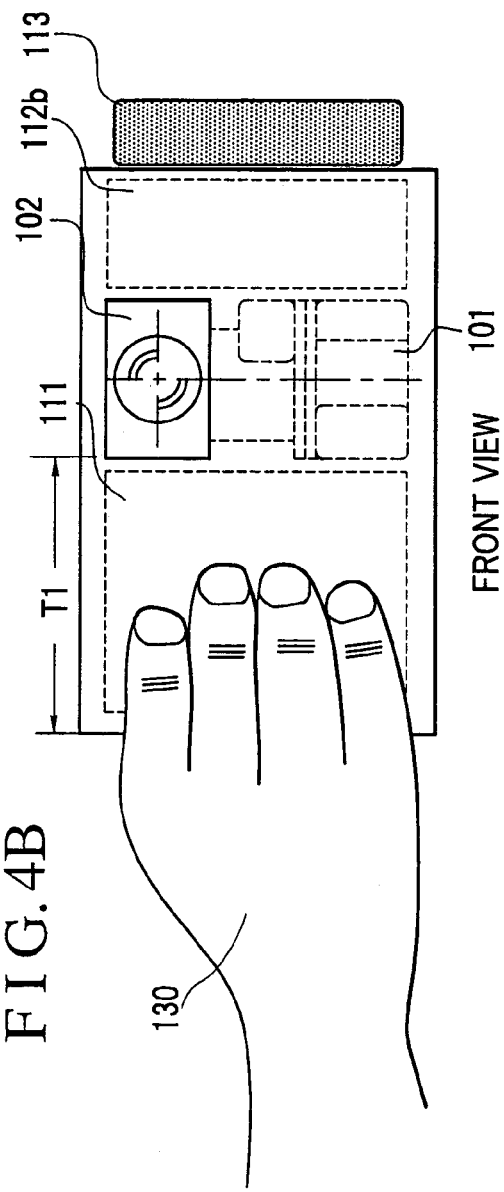
FIG. 4A
FIG. 4B

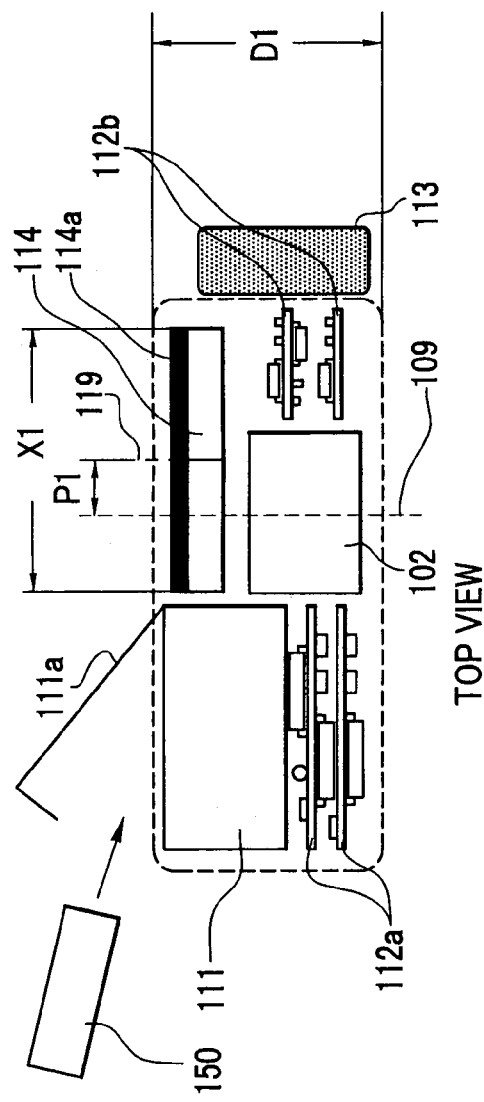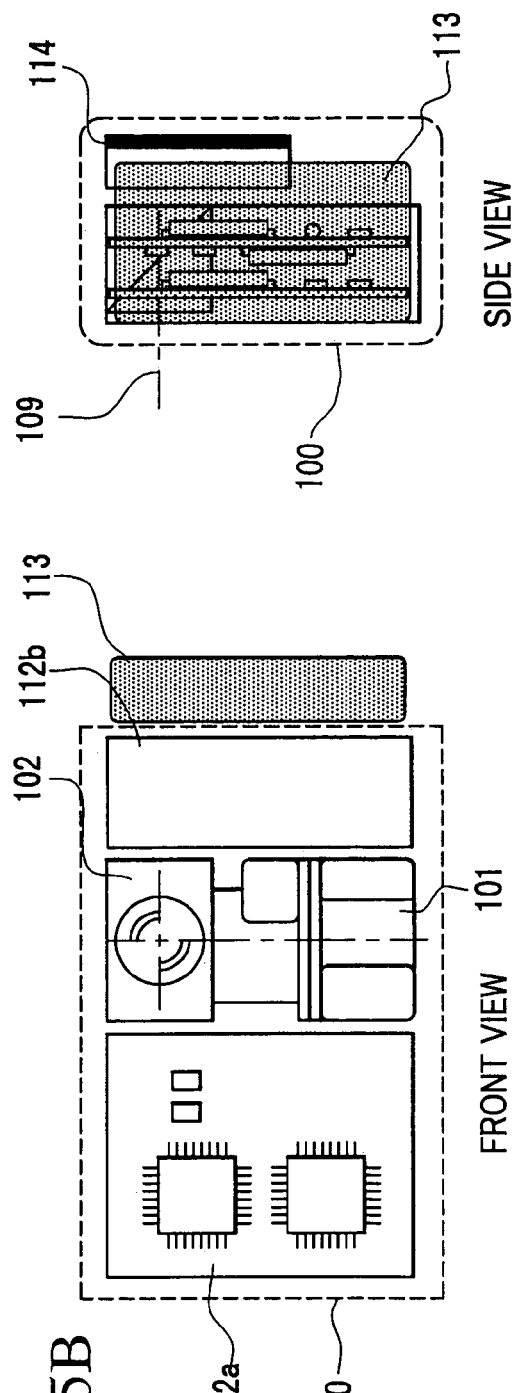

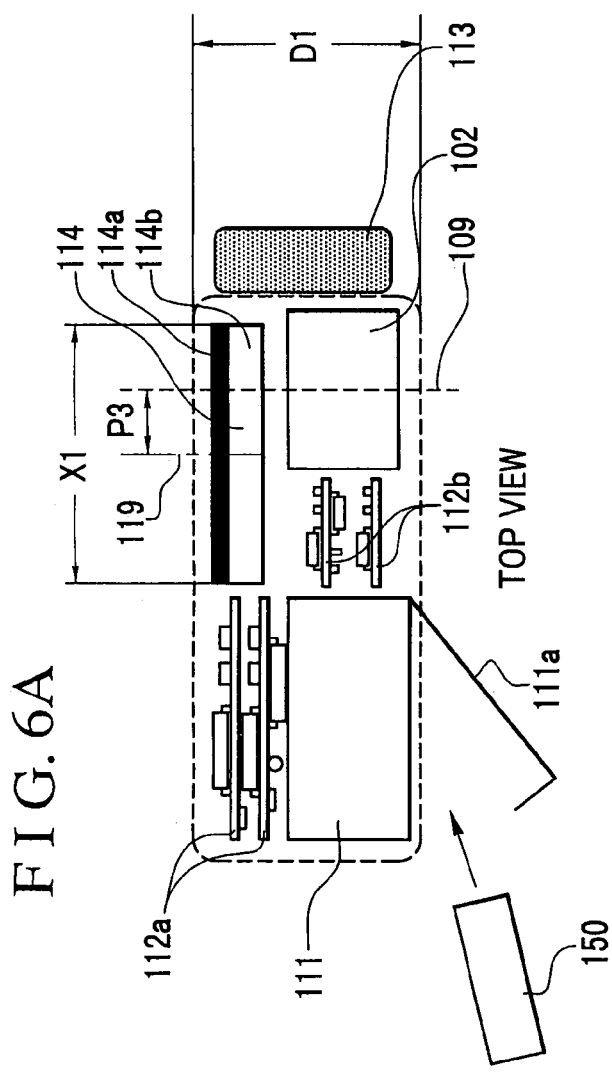
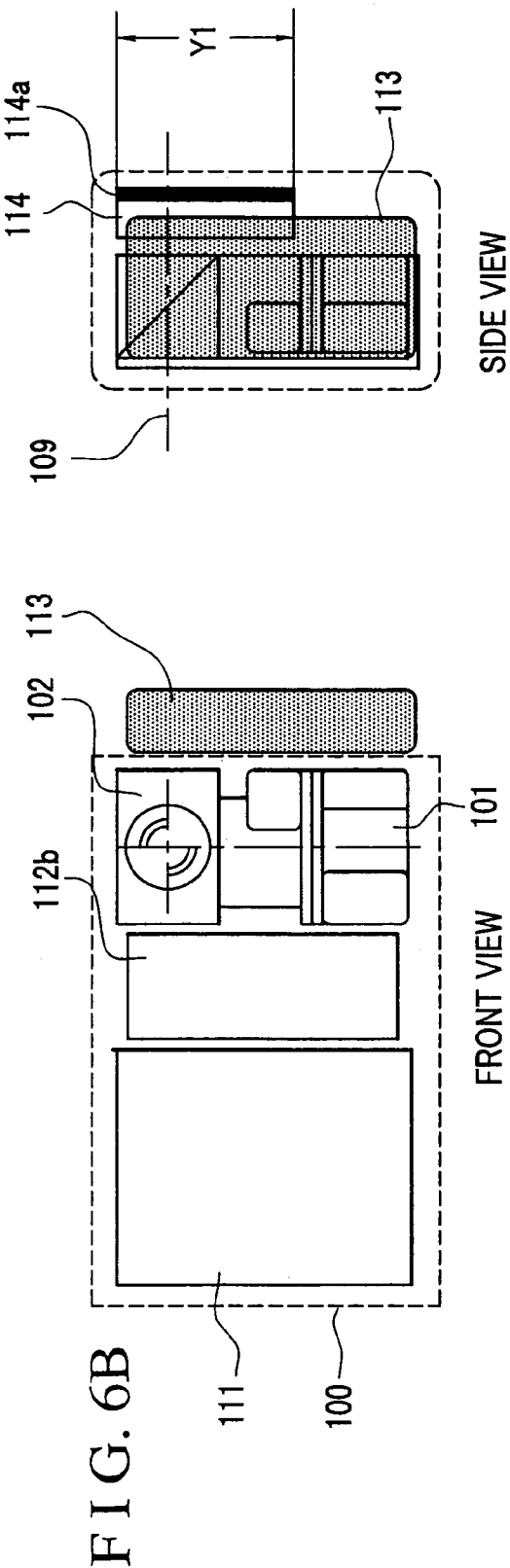
FIG. 6A TOP VIEW
FIG. 6B FRONT VIEW
FIG. 6C SIDE VIEW

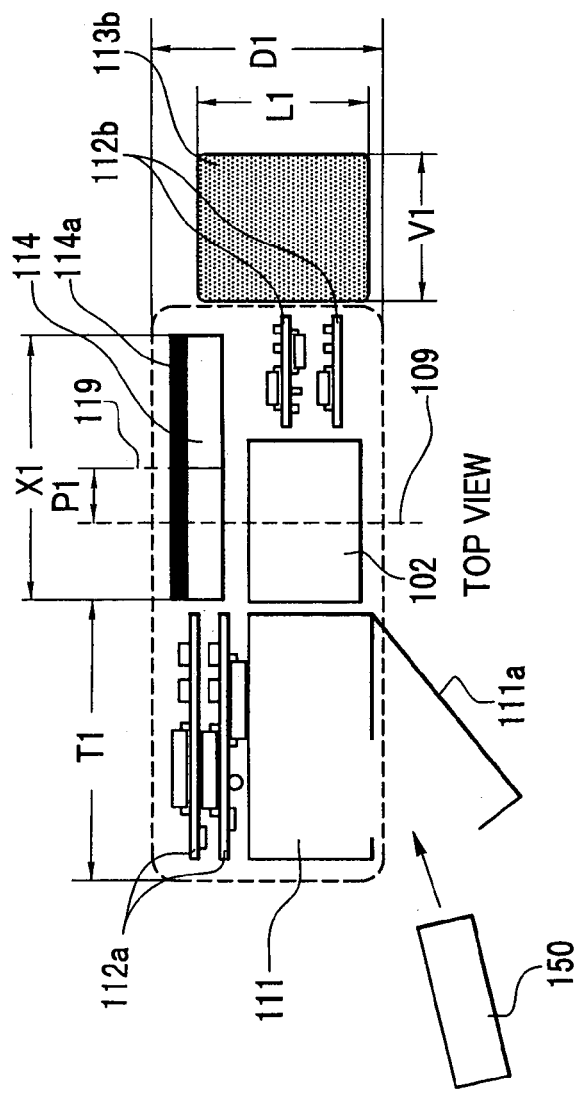
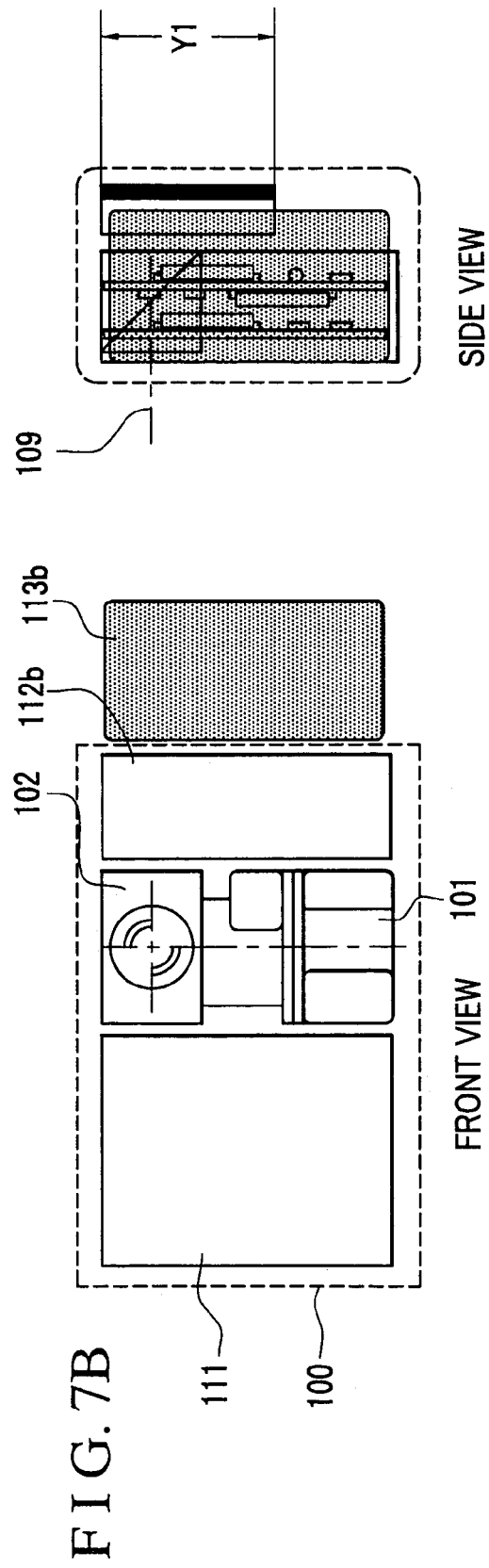

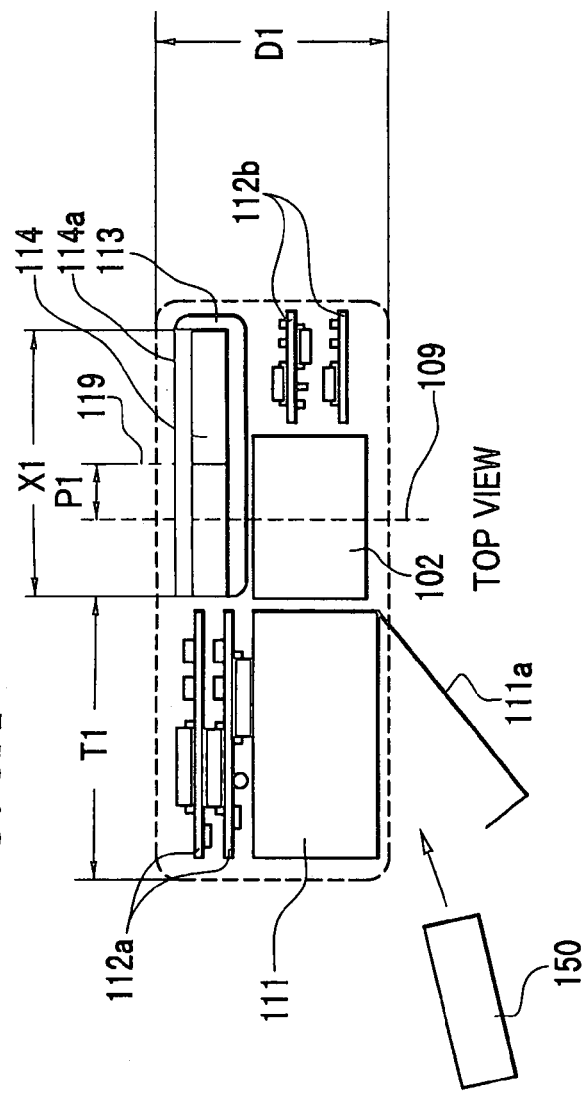
F I G. 8A
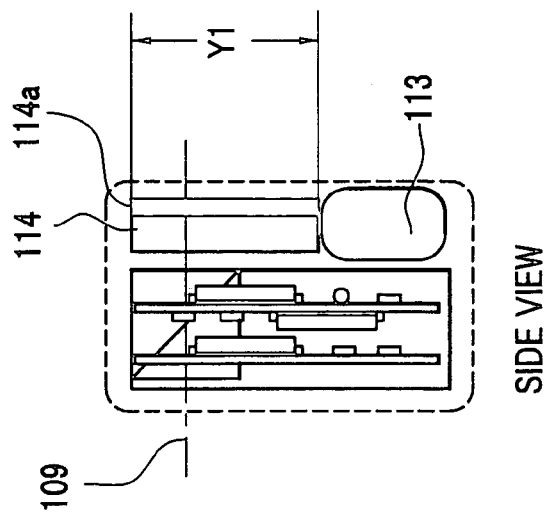
F I G. 8C
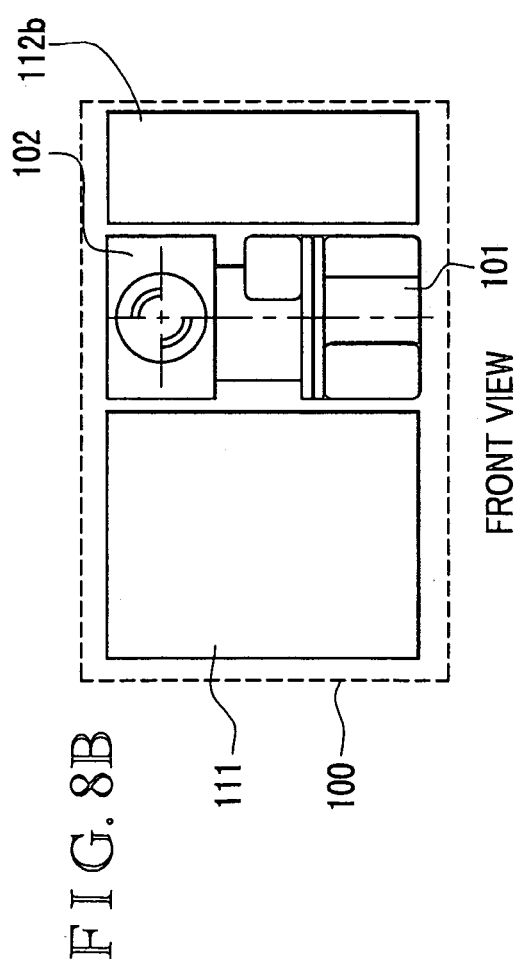
F I G. 8B

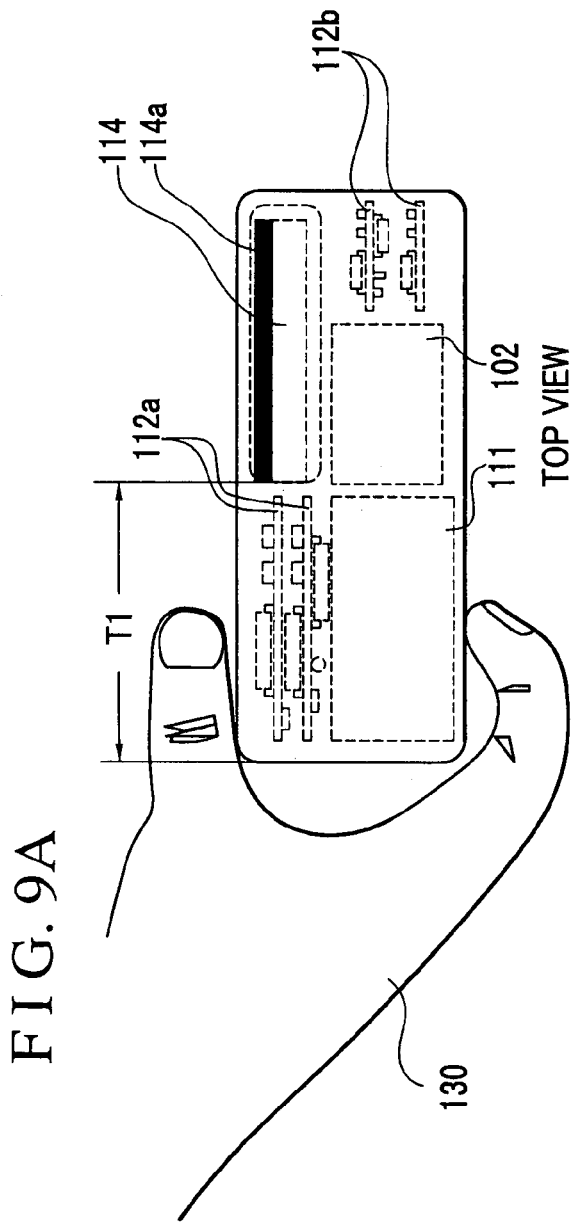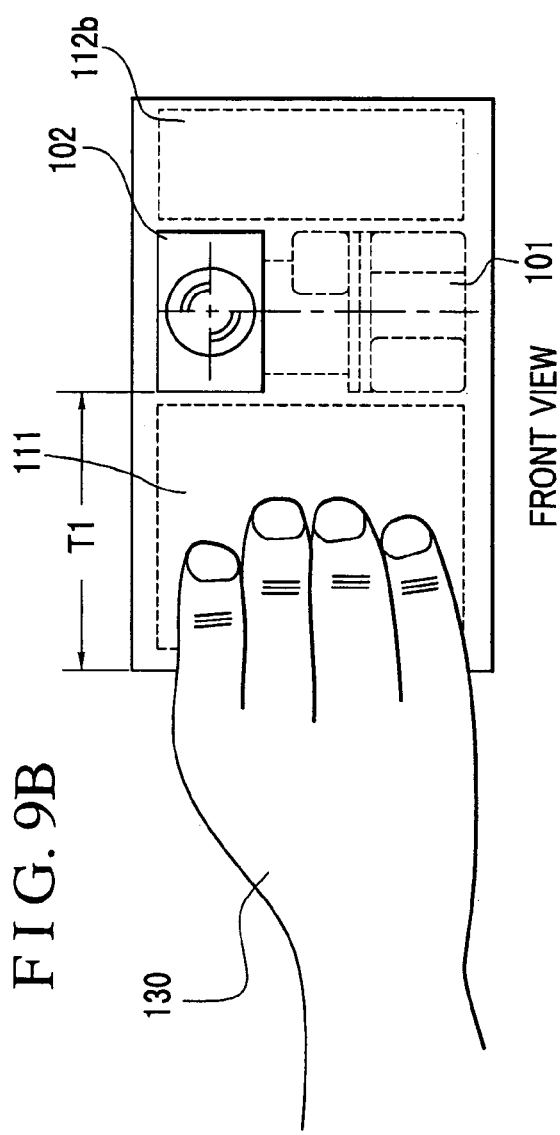
FIG. 9A
FIG. 9B

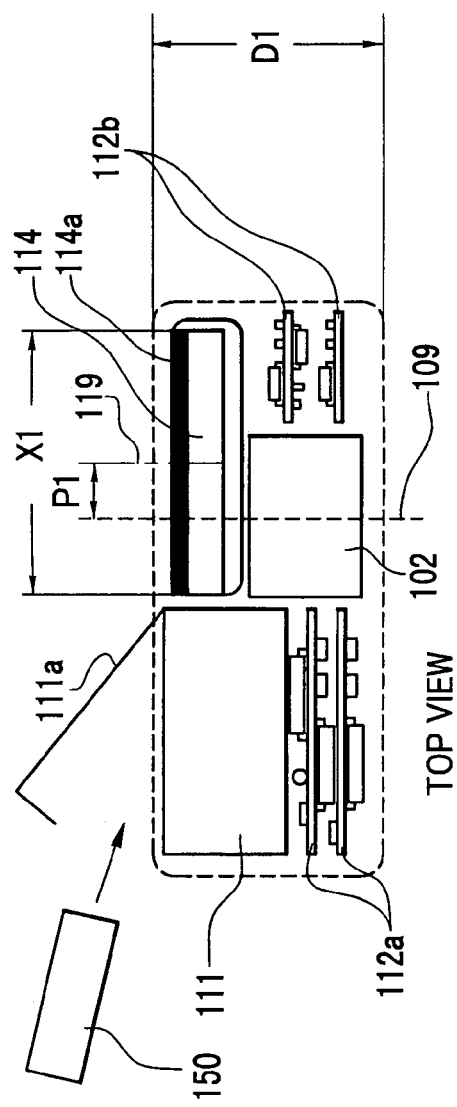
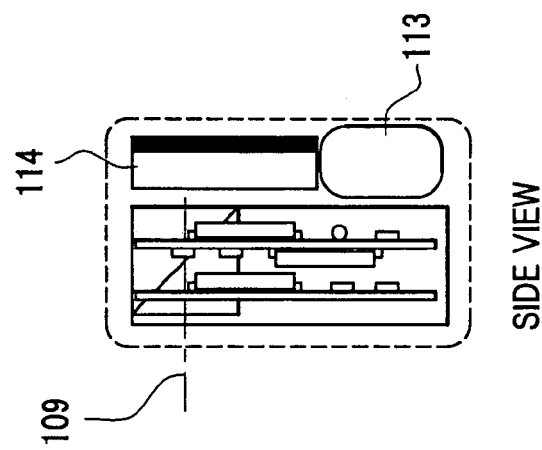
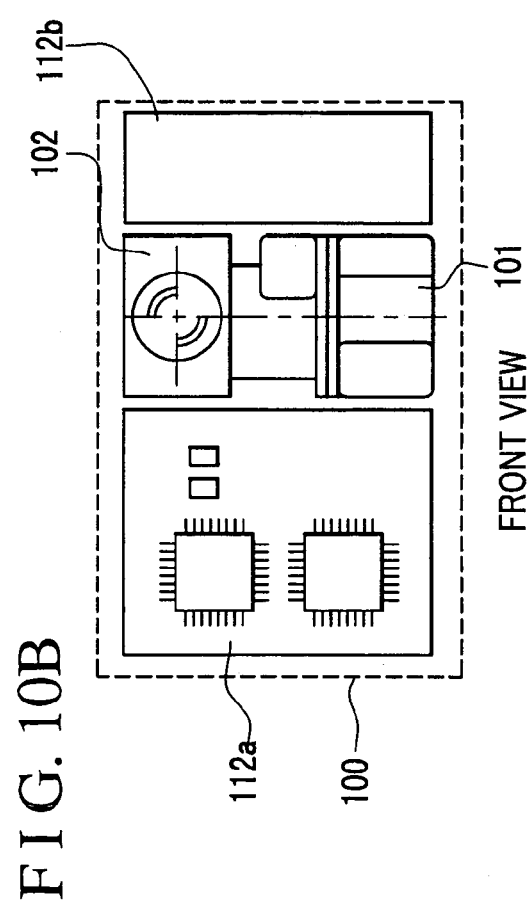
FIG. 10A  TOP VIEW
FIG. 10B  FRONT VIEW
FIG. 10C  SIDE VIEW

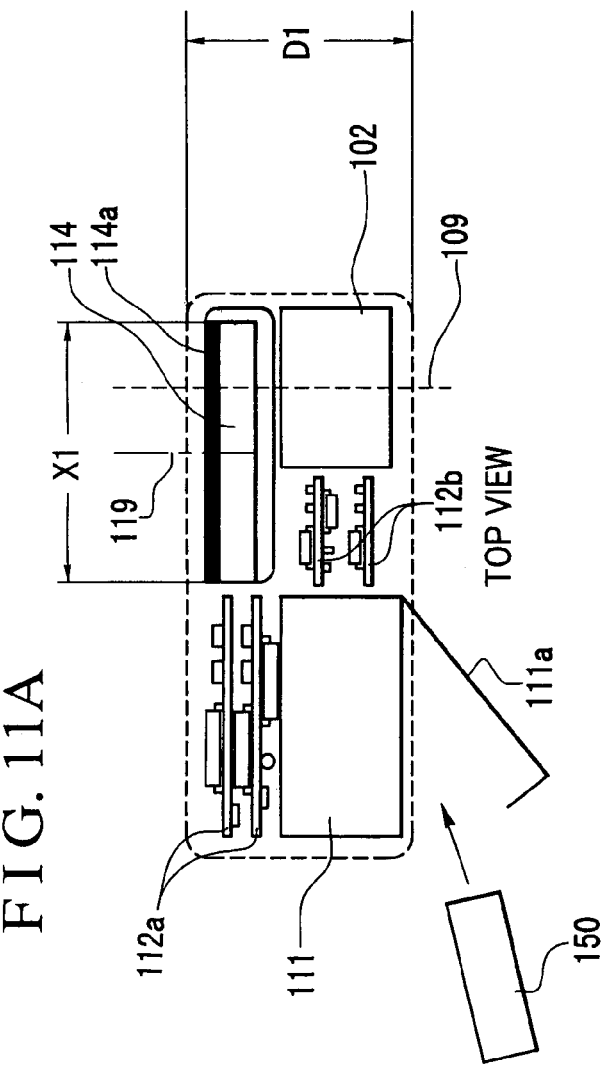
FIG. 11A TOP VIEW
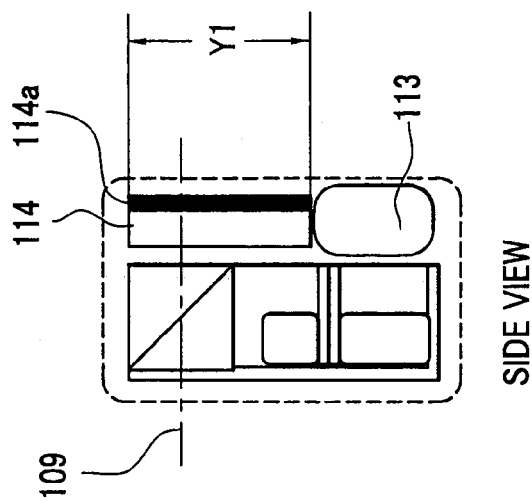
FIG. 11C SIDE VIEW
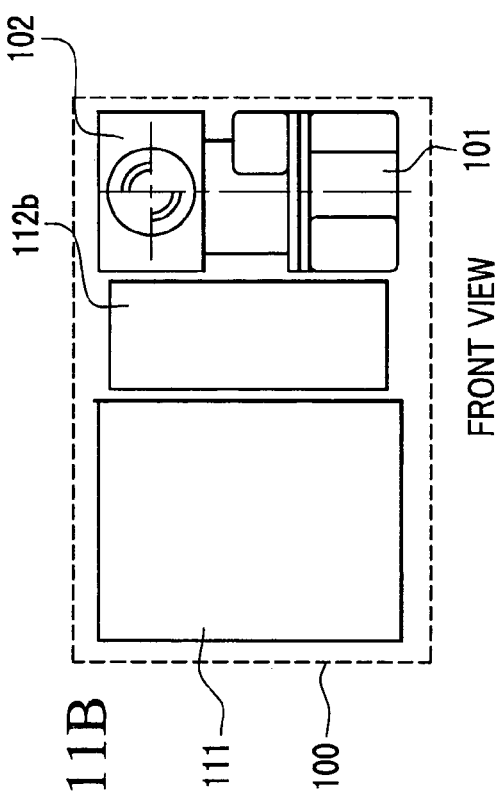
FIG. 11B FRONT VIEW

SIDE VIEW

FRONT VIEW

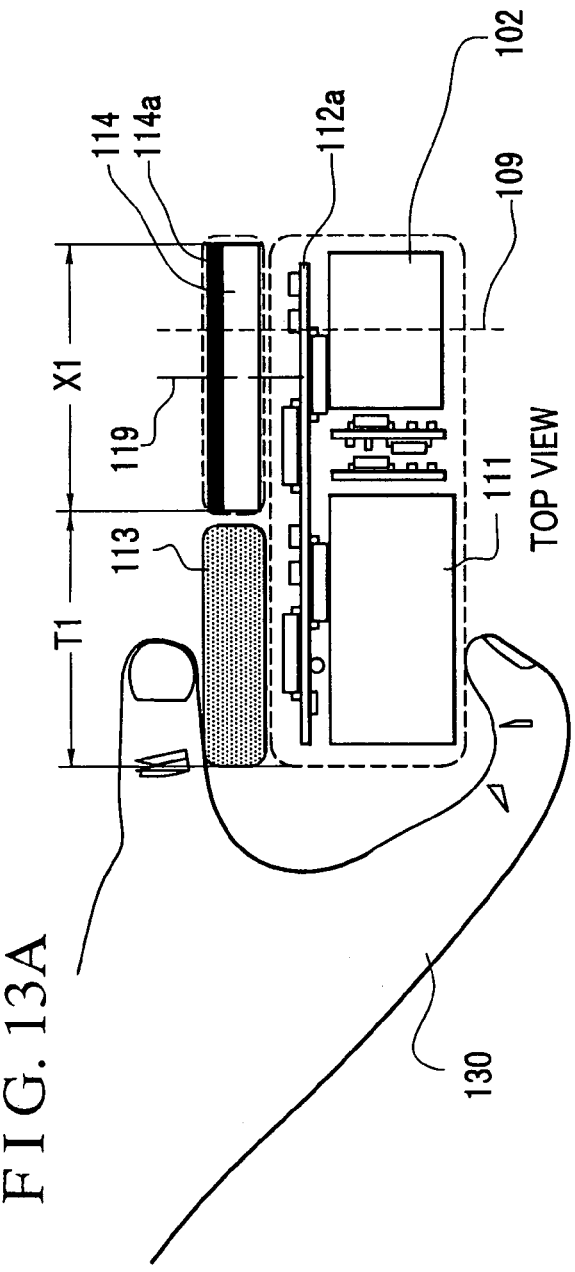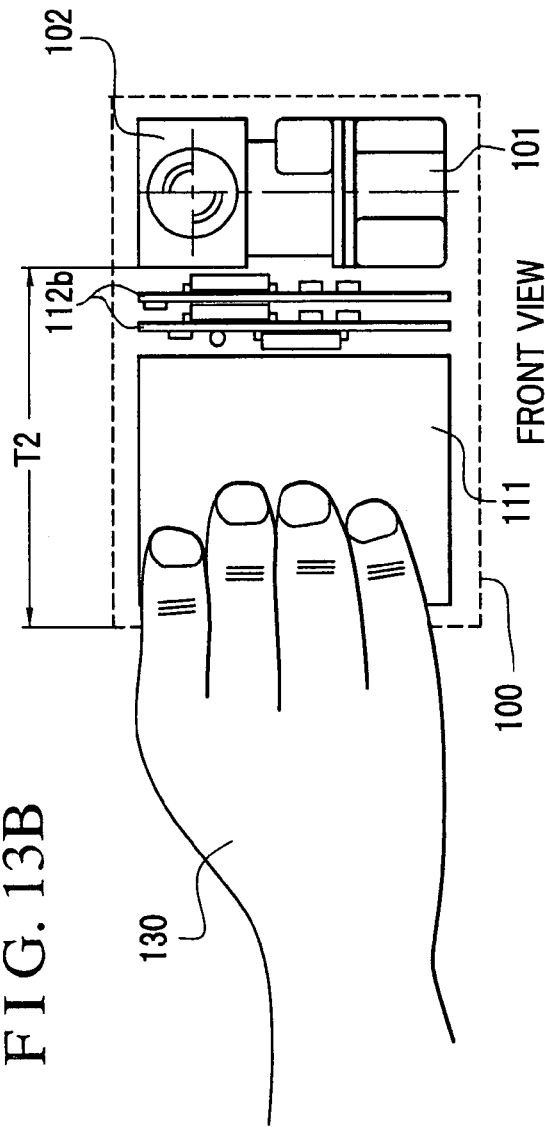
FIG. 13A
FIG. 13B

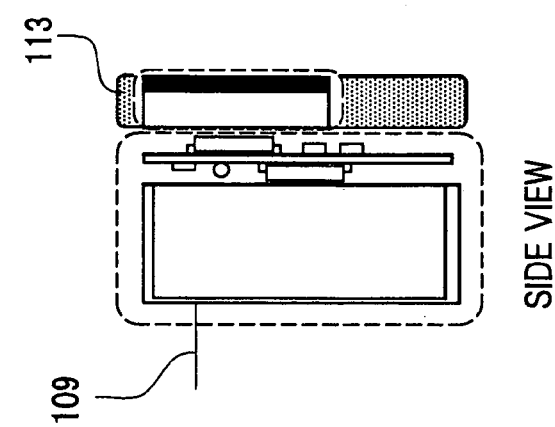
FIG. 16C SIDE VIEW
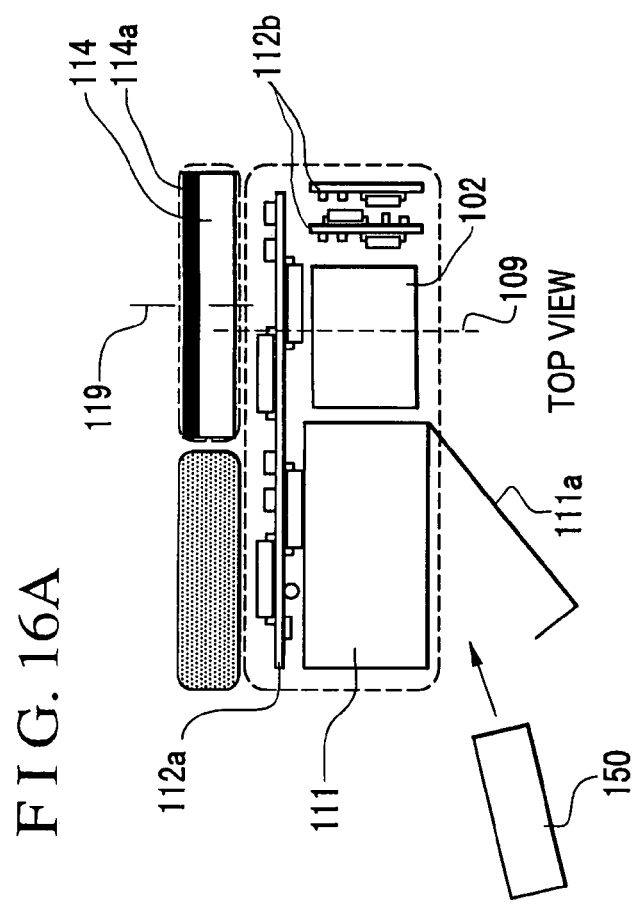
FIG. 16A
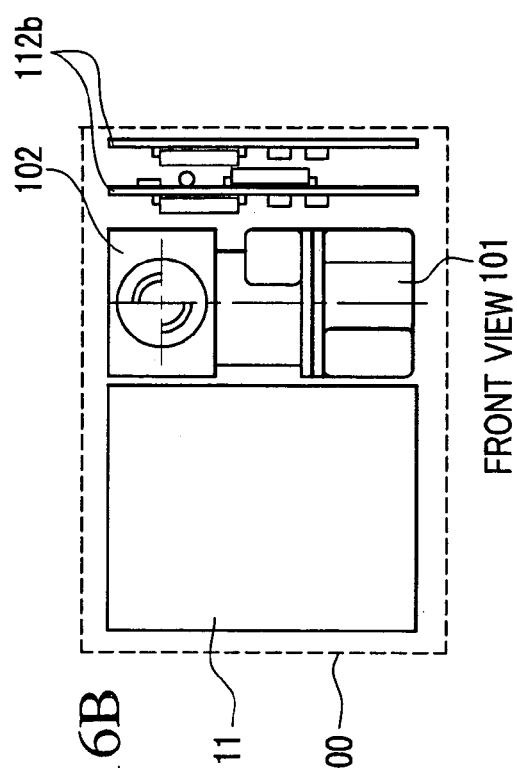
FIG. 16B FRONT VIEW

TOP VIEW

FRONT VIEW

SIDE VIEW

TOP VIEW

FRONT VIEW

SIDE VIEW

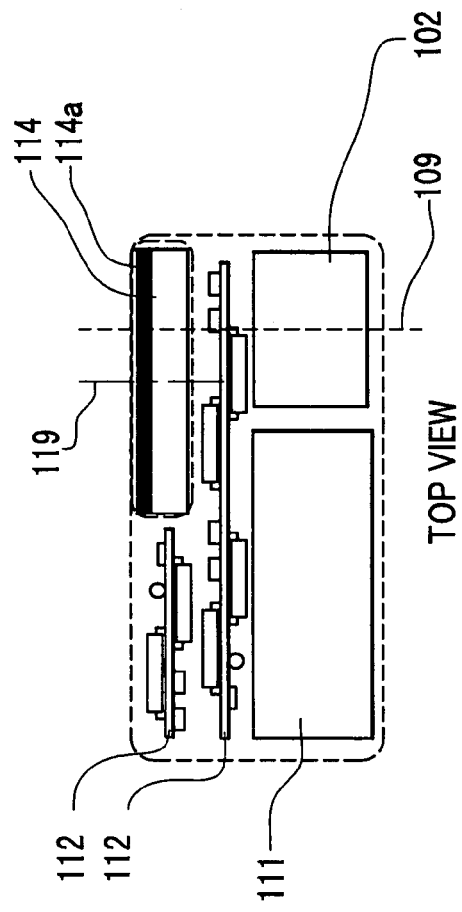
FIG. 20A  TOP VIEW
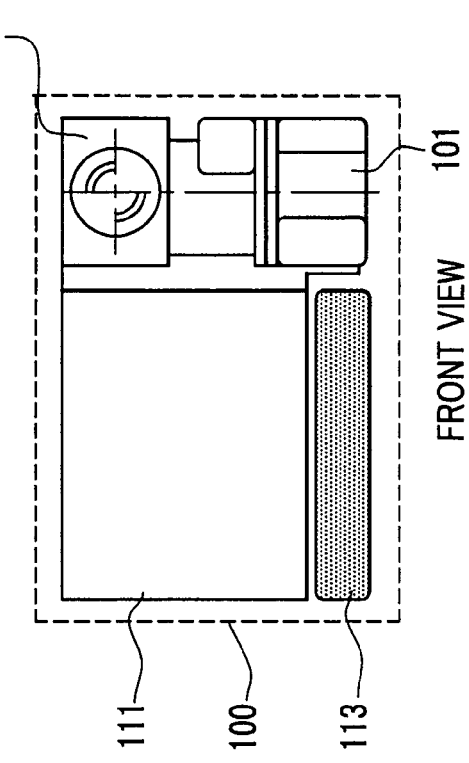
FIG. 20C  FRONT VIEW
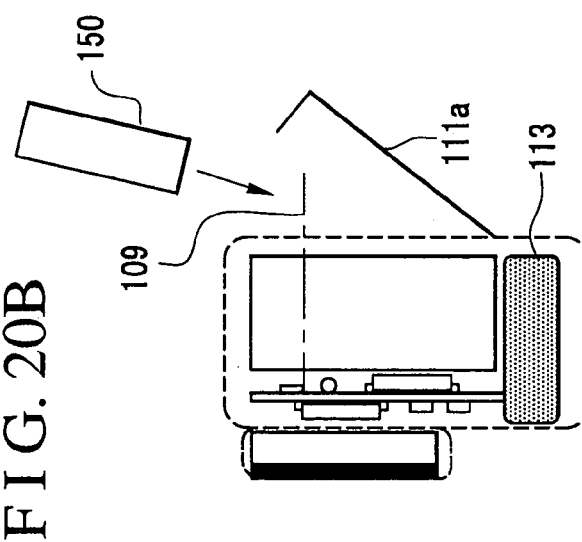
FIG. 20B  SIDE VIEW

TOP VIEW

FRONT VIEW

SIDE VIEW

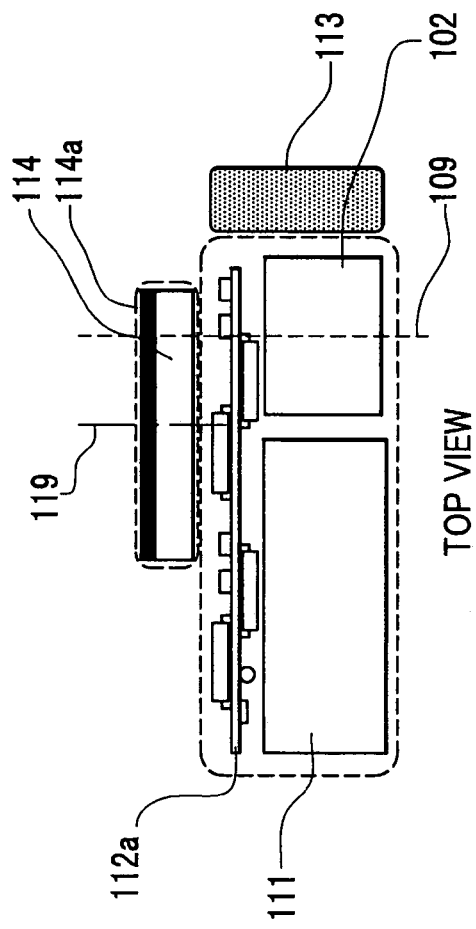
FIG. 24A
FIG. 24C  FRONT VIEW
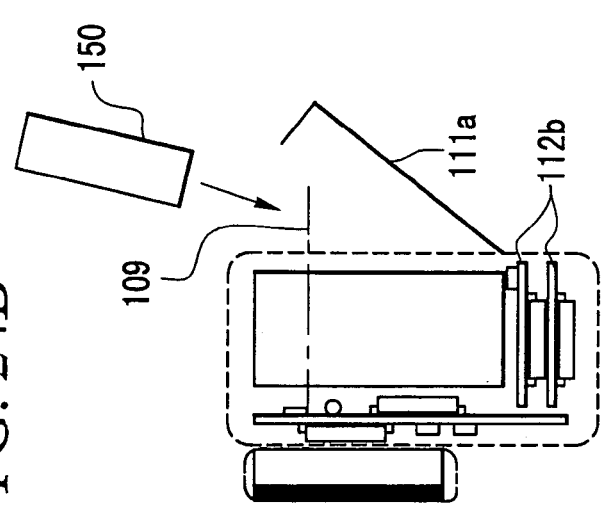
FIG. 24B  SIDE VIEW

SIDE VIEW

FRONT VIEW

TOP VIEW

FRONT VIEW

SIDE VIEW

SIDE VIEW

TOP VIEW

FRONT VIEW

IMAGE PICKUP APPARATUS WITH PRISM OPTICAL SYSTEM

BACKGROUND OF THE INVENTION

1. Field of the Invention

The present invention relates to an image pickup apparatus such as a video camera and a digital camera, and to a viewfinder for the image pickup apparatus.

2. Description of Related Art

FIG. 26 to FIGS. 29A and 29B illustrate the structural arrangement of a conventional image pickup apparatus. In these illustrations, reference numeral 5000 designates an exterior cover of the image pickup apparatus and reference numeral 5001 denotes an image pickup lens. Although not shown, there exists an image pickup element for converting the light incident through the image pickup lens 5001 into an electric signal. Further, reference numeral 5011 represents a recording section for recording data on a recording medium 5050 such as a magnetic tape, and reference numeral 5012 signifies a signal processing circuit board for processing a picked-up image signal or the like. Still further, reference numeral 5013 indicates a battery for supply power to drive the whole video camera, and reference numeral 5014 stands for a monitor such as an LCD.

As seen in these illustrations, in the conventional image pickup apparatus, its components protrude by dimensions Aj, Bj and Cj with respect to the body with a dimension of Dj. This irregular configuration makes the inconvenience in encasing it in a bag or the like. In addition, when carried, the irregular configuration causes unstable conditions, that is, deteriorates its portability.

FIG. 28B shows a state where a cover 5011a is opened to remove/load the recording medium 5050. As seen from this illustration, in the case of the conventional image pickup apparatus, the recording medium 5050 is required to be taken out or loaded from the below. For this reason, when a tripod or the like is set onto a bottom surface section of the conventional image pickup apparatus, difficulty is encountered to remove/load the recording medium 5050.

Furthermore, reference numeral 5009 represents the optical axis of the image pickup lens 5001, and reference numeral 5014a designates a display screen of the monitor 5014. Further, reference numeral 5019 denotes the center line of the display screen 5014a. Still further, reference numeral 5030 signifies the hand of a photographer. As shown in FIG. 29A, when viewed from the top surface side of the image pickup apparatus, the image pickup lens optical axis 5009 is largely shifted by a dimension Pj with respect to the center line 5019 of the display screen 5014a. For this reason, the parallax is high at photographing, and particularly, when photographing a subject close thereto, the photographing becomes hard to extremely impair the convenience in handling.

In addition, as shown in FIG. 29A, when the photographer holds the conventional image pickup apparatus, the right-hand thumb section of the photographer reaches the display screen 5014a, and hence, the display screen 5014 is hidden to be hard to see due to the existence of the right-hand thumb section of the photographer, or the display screen 5014 is made dirty because of the appearance of fingerprints of the photographer, so that a problem on operability exists. Further, if the photographer holds the image pickup apparatus while avoiding the covering of the display screen 5014a by his or her thumb section, his or her right hand becomes limited in holding the image pickup apparatus, so that the operability extremely deteriorates in holding the image pickup apparatus.

Meanwhile, recently, in the field of an image pickup apparatus such as a recorder-integrated video camera (which will be referred hereinafter to as a video camera), the size reduction and the high-quality function have rapidly been in progress, and the convenience in handling to the user has improved. For instance, there has been proposed video cameras which can take various photographing positions. As one of these video cameras, there is a video camera equipped with both a liquid crystal monitor with a dimension of approximately 2 to 4 inches which is visible from a remote position and an eyepiece-type viewfinder which has an optical system in the middle and which is used in a state where the eye of the photographer is brought close to the eyepiece window.

In the case of such a video camera, the use of the viewfinder is possible in accordance with the photographing posture. For example, when taking a picture at a low angle or at a high angle, or when being attached to a tripod, that is, in cases where the photographing is more easily feasible if the eye of the photographer is separated from the video camera, the photographing is made through the use of the liquid crystal monitor, and in cases where the video camera is held by the hand of the photographer and used at an eye level, the photographing is done through the eyepiece-type viewfinder.

However, the video camera thus constructed is required to be equipped with a drive circuit, a signal processing circuit, a backlight and others for each of a liquid crystal panel for displaying a monitored image and an eyepiece viewfinder liquid crystal display unit, with the result that the increase in cost is unavoidable. For eliminating this problem, there has been proposed a structure in which the liquid crystal monitor is used as both the viewfinder (eyepiece-type) and the monitor. This is achievable in such a manner that an eyepiece section (eyepiece lens section) is installed in a liquid crystal monitor whose dimension is approximately 2 to 4 inches. This structure will be described hereinbelow.

FIG. 31 illustratively shows the structure of such a viewfinder. In FIG. 31, a first mirror 920 is obliquely placed in an opposed relation to a screen 901a of a liquid crystal panel 901, and a second mirror 921 is located in its reflection optical path. In addition, a positive lens 922 is situated between the second mirror 921 and the eye 907 of the photographer. The positive lens 922 is disposed at a position not existing above the screen 901a. The first mirror 920, the second mirror 921 and the positive lens 922 constitute an eyepiece section. This eyepiece section is made to be detachable from the viewfinder.

In such a structure, when directly viewing from a remote position, the photographer detaches the eyepiece section and directly looks into the viewfinder by the eye 907 from a direction opposite to the screen 901a of the liquid crystal panel 901. On the other hand, in the case of using the viewfinder as an eyepiece type, the viewfinder is used in a state where the eyepiece section is attached thereto. The image displayed on the screen 901a of the liquid crystal 901 is reflected by the first mirror 920 toward the second mirror 921, so that the second reflection occurs by the second mirror 921 to lead the reflected image toward the positive lens 922. The positive lens 922 forms the image from the second mirror 921 on the retina of the eye 907 of the photographer. In this case, because the reflection takes place twice by the mirrors 920 and 921, the image on the screen 901a again returns to an erecting image which in turn, is viewed by the photographer.

In the case of the viewfinder having the above structure, its screen size is considerably large as compared with a common eyepiece-type viewfinder, the magnification of the positive lens 922 provides a significant factor. That is, if the positive lens 922 is set to a magnification equal to that of the common eyepiece-type viewfinder, since the screen size is large and the size of each of the picture elements (pixels) constituting the screen is also large, two problems occur, that is, the image expands not to fall within the field of view of the photographer and each of the picture elements becomes coarsely conspicuous.

Assuming that the size of the screen 901a takes 3 inches (in diagonal length), for setting to a proper angle of visibility, the magnification of the positive lens 922, when expressed in focal length, comes to approximately 110 to 180 mm equivalent to four or five times that of the common eyepiece-type viewfinder, and hence, setting to a considerable low magnification is necessary. If setting to this magnification, the problem that the coarseness of each picture element is conspicuous is simultaneously solvable. However, the distance from the screen 901a to the positive lens 922 for offering a proper diopter is unconditionally determined to be a value close to 90% of the focal length. Accordingly, in the case of this example, the image goes back and forth through the optical path of approximately 100 to 160 mm due to the first mirror 920 and the second mirror 921, and then, is led to the positive lens 922.

However, in the case of the above conventional viewfinder, it is required that the first mirror 920 be placed at a position not blocking the light beam advancing from the second mirror 921 to the positive lens 922 and the second mirror 921 be placed at a position not obstructing the light beam advancing from the liquid crystal panel 901 to the first mirror 920, the configuration of the whole eyepiece section increases in volume to considerably protrude toward above the liquid crystal panel 901.

BRIEF SUMMARY OF THE INVENTION

The present invention has been developed with a view to eliminating the above problems, and it is, therefore, an object of the invention to provide an image pickup apparatus which offers an excellent operability and portability and further accomplishes the size reduction.

Another object of the invention is to provide a viewfinder for an image pickup apparatus which is capable of achieving the volume reduction as a whole for the weight reduction.

To attain at least one of the above objects, in accordance with an aspect of the invention, there is provided an image pickup apparatus, which comprises an image pickup apparatus body substantially having a rectangular parallelepiped configuration, a prism optical system, which is placed on a front-side upper portion of the image pickup apparatus body, for turning a subject image by approximately 90 degrees downwardly in the image pickup apparatus body, a lens barrel for adjusting focus and zoom of the subject image turned by approximately 90 degrees by the prism optical system, an image pickup element for converting the subject image, the focus and zoom of which have been adjusted through the lens barrel, into an electric signal for image pickup, and a monitor, which is composed of a liquid crystal display screen and a backlight for illuminating the liquid crystal display screen and is disposed on a rear surface of the prism optical system, for reproducing and displaying a subject image represented by the electric signal outputted from the image pickup element, in a direction parallel with an optical axis of the subject image incident on the prism optical system, wherein an image pickup surface of the image pickup element is situated to make an angle of approximately 90 degrees with respect to the liquid crystal display screen.

Further, in accordance with another aspect of the invention, there is provided a viewfinder for an image pickup apparatus, the viewfinder being detachably attachable to a display panel which is located at a predetermined position of the image pickup apparatus so that a display screen thereof is externally exposed, the viewfinder comprising an optical system, which includes a first reflecting mirror disposed on the display screen at an angle of 45 degrees or less with respect to the display screen, a second reflecting mirror disposed in parallel to the first reflecting mirror and arranged to reflect a light beam from the first reflecting mirror in a direction parallel to light incident on the first reflecting mirror, and an eyepiece lens constructed with a combination of a negative lens and a positive lens for forming an image of a light beam from the second reflecting mirror on a predetermined position.

The above and other objects and features of the invention will become more readily apparent from the following detailed description of preferred embodiments thereof taken in conjunction with the accompanying drawings.

BRIEF DESCRIPTION OF THE SEVERAL VIEWS OF THE DRAWING

FIGS. 2A and 2B are exploded perspective views showing the image pickup lens in the first embodiment.

FIGS. 4A and 4B are illustrations of photographing states of the image pickup apparatus according to the first embodiment.

FIGS. 5A to 5C are illustrations of an image pickup apparatus according to a second embodiment of the invention.

FIGS. 6A to 6C are illustrations of an image pickup apparatus according to a third embodiment of the invention.

FIGS. 7A to 7C are illustrations of an image pickup apparatus according to a fourth embodiment of the invention.

FIGS. 8A to 8C are illustrations of an image pickup apparatus according to a fifth embodiment of the invention.

FIGS. 9A and 9B are illustrations of photographing states of the image pickup apparatus according to the fifth embodiment.

FIGS. 10A to 10C are illustrations of an image pickup apparatus according to a sixth embodiment of the invention.

FIGS. 11A to 11C are illustrations of an image pickup apparatus according to a seventh embodiment of the invention.

FIGS. 13A and 13B are illustrations of photographing states of the image pickup apparatus according to the eighth embodiment.

FIGS. 16A to 16C are illustrations of an image pickup apparatus according to an eleventh embodiment of the invention.

FIGS. 20A to 20C are illustrations of an image pickup apparatus according to a fourteenth embodiment of the invention.

FIGS. 24A to 24C are illustrations of an image pickup apparatus according to a seventeenth embodiment of the invention.

DETAILED DESCRIPTION OF THE INVENTION

Figure 1A:
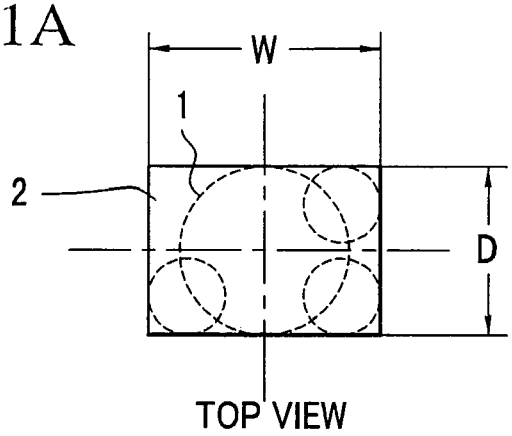
FIGS. 1A to 1D are illustrations of a structure or arrangement of an image pickup lens in a first embodiment of the invention.
Figure 1B:
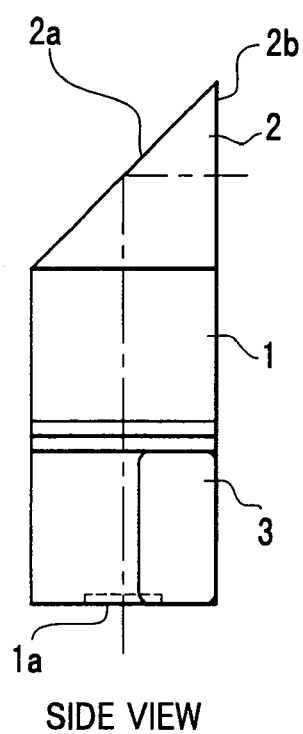
Figure 1C:
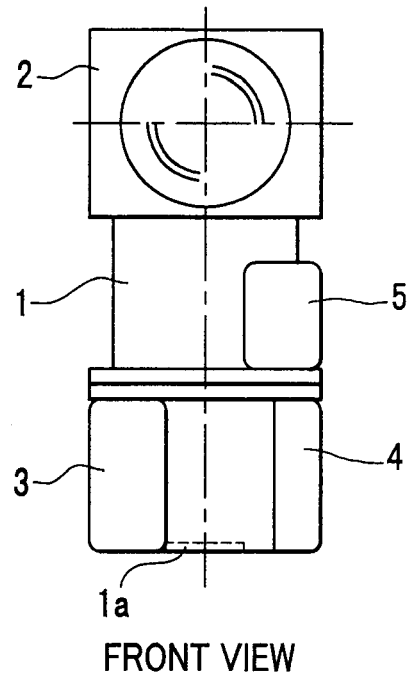
Figure 1D:
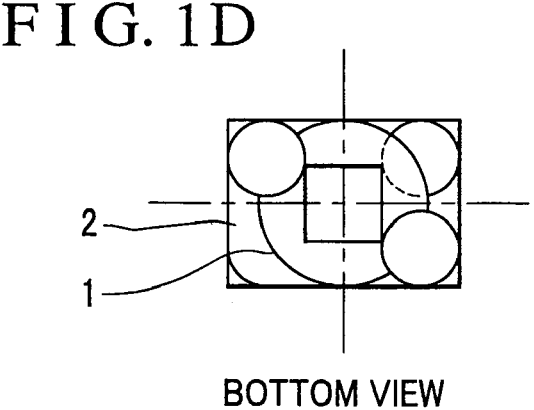

Hereinafter, preferred embodiments of the invention will be described in detail with reference to the drawings.

First Embodiment

FIGS. 1A to 1D are illustrations of a structure of an image pickup lens used in a first embodiment of the invention. In these illustrations, reference numeral 1 designates a lens barrel, reference numeral 2 represents a prism for bending or turning the optical axis by approximately 90 degrees, reference numeral 2b depicts an entrance surface, reference numeral 2a denotes a reflection surface for reflecting incident light. Further, reference numeral 3 stands for a focusing motor, reference numeral 4 indicates a zooming motor, and reference numeral 5 signifies an IG meter.

An optical image is incident through the entrance surface 2b into the prism 2 so that its optical axis is turned by approximately 90 degrees with the reflection surface 2a, and is then incident upon the lens barrel 1, before being photo-electrically converted into an electrical signal by a CCD 1a functioning as an image pickup element. In the lens barrel 1, a focusing lens (not shown) is driven by the focusing motor 3 to adjust focus. The exposure adjustment is optimally made by driving a diaphragm (not shown) within the lens barrel 1 with the IG meter 5.

FIGS. 2A and 2B are exploded perspective views showing the image pickup lens used in the first embodiment. Of these, FIG. 2A is an illustration of a state where the prism 2 is detached therefrom and FIG. 2B is an illustration of a state where the prism 2 is attached thereto.

In the above-mentioned image pickup lens in the first embodiment, actuators including the focusing motor 3, the zooming motor 4 and the IG meter 5 are accommodated within a dimension W and dimension D organizing the projection dimension of the prism 2, while in the prior art, they are disposed in a space being a dead space.

Figure 3A:
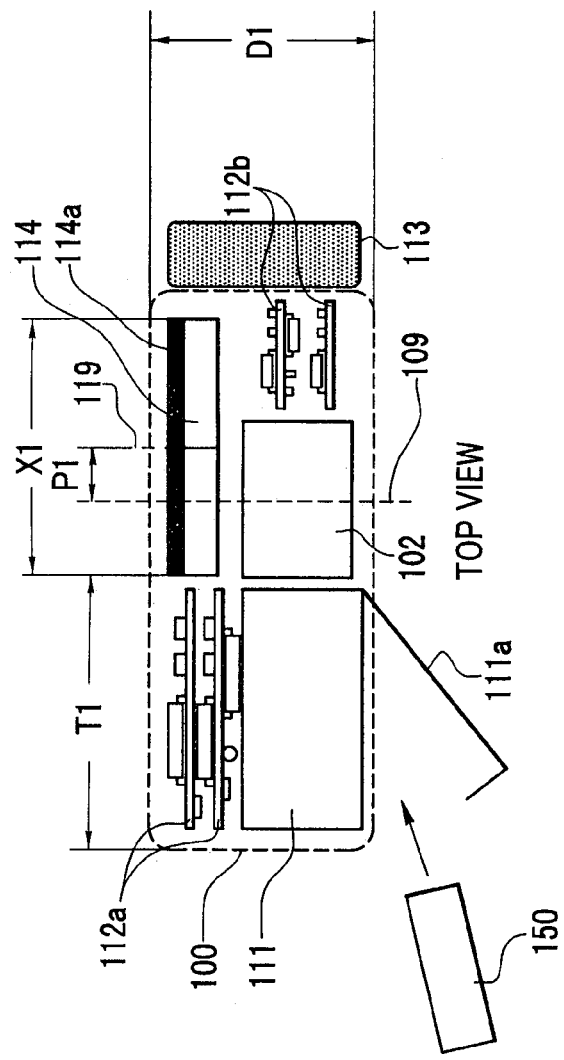
FIGS. 3A to 3C are illustrations of an image pickup apparatus according to the first embodiment.
Figure 3C:
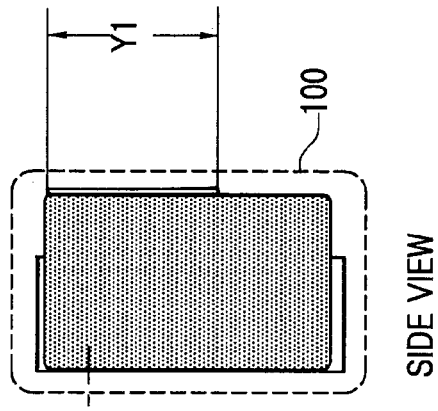
Figure 3B:
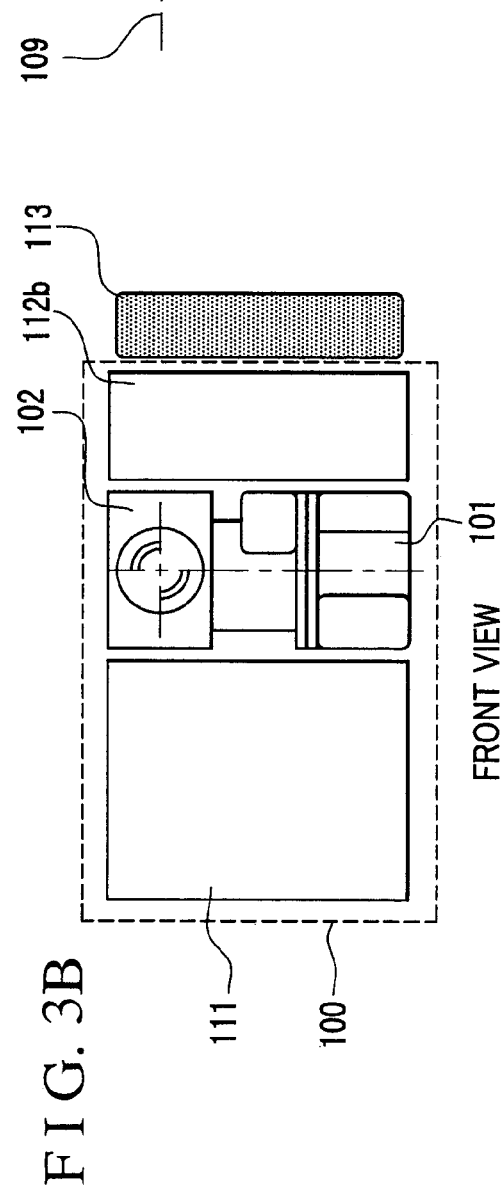

FIGS. 3A to 3C are illustrations of an arrangement of the image pickup apparatus according to the first embodiment. In these illustrations, reference numeral 100 denotes an exterior cover, reference numeral 101 represents the image pickup lens described above with reference to FIGS. 1A to 1D and FIGS. 2A and 2B, and reference numeral 102 depicts a prism in the image pickup lens 101. Further, reference numeral 111 signifies a recording/reproducing section in which a video signal is recorded/read out in a recording medium such as a magnetic tape, a solid memory such as a semiconductor memory, a hard disk and an optical recording medium. Still further, reference numerals 112a and 112b denote electric circuit boards for conducting the processing of a video signal and other processing.

In addition, reference numeral 114 represents a monitor such as an LCD. Further, reference numeral 114a designates a liquid crystal display screen of the monitor 114, and reference numeral 114b depicts a backlight for illuminating the liquid crystal display screen 114a, with these component organizing the monitor 114. Reference numeral 119 denotes a center line of the display screen 114a. Still further, reference numeral 150 represents a recording medium such as a magnetic tape, a solid memory based upon a semiconductor, a hard disk and an optical recording medium which is detachable. In the image pickup apparatus according to the first embodiment, the monitor 114 and the image pickup lens 101, and the recording/reproducing section 111 and the electric circuit board 112 are respectively disposed in a piled-up condition with respect to the photographing direction. Further, these combinations are arranged in parallel to each other. In addition, a battery 113 is located at a side surface of the body of the image pickup apparatus.

Thus, in the image pickup apparatus according to the first embodiment, the respective components of the image pickup apparatus fall within the thickness dimension D1, thus eliminating the irregular configuration. Accordingly, unlike the conventional image pickup apparatus, it is possible to eliminate the disadvantage that the apparatus is hard to store in a bag because of its irregularity, and further to provide the stability in carrying the apparatus.

Furthermore, the recording medium 150 is attachable and detachable by opening and closing a cover 111a disposed on a side surface of the image pickup apparatus body. Thus, the loading and removal of the recording medium 150 become feasible even when a tripod or the like is attached to the image pickup apparatus body.

Still further, the image pickup lens optical axis 109 is within a range of the dimension X1 in the horizontal direction of the display screen 114a and the dimension. Y1 in the vertical direction thereof, that is, the image pickup lens optical axis 109 lies within the display area of the display section 114a. This minimizes the difference between the image pickup lens optical axis 109 and the center line 119 of the display screen 114a, which makes the photography easy, particularly, when photographing a near subject, and which offers extremely good operability.

FIGS. 4A and 4B show a state where the photography is done through the use of the image pickup apparatus according to the first embodiment. As shown in FIGS. 4A and 4B, when the photographer holds the image pickup apparatus, the distance. T1 from a side surface of the image pickup apparatus to a side surface of the display screen 114a is securable to be equal to the dimension of the recording/reproducing section 111.

This arrangement can eliminate the drawback that the display screen is hard to see because of being hidden with the right-hand thumb of the photographer or that the display screen is made dirty with fingerprints of the photographer. In addition, it can solve the problem that the right hand of the photographer becomes tight for holding, because the thumb section of the photographer is positioned not to reach the display screen 5014a.

Besides, the fingers of the photographer do not reach the prism 102, so that the operability sharply improves.

Second Embodiment

FIGS. 5A to 5C are illustrations of a structure of an image pickup apparatus according to a second embodiment of the invention. The reference numerals used in FIGS. 5A to 5C which are the same as those in the first embodiment signify the same parts, and the description thereof will be omitted for brevity.

In the second embodiment, the electric circuit board 112a is disposed on the photographing direction side within the interior of the image pickup apparatus body, while the recording/reproducing section 111 is located on the side of the monitor 114.

The image pickup apparatus constructed as shown in FIGS. 5A to 5C can provide the same effects as those of the first embodiment.

Third Embodiment

FIGS. 6A to 6C are illustrations of a structure of an image pickup apparatus according to a second embodiment of the invention. The reference numerals used in FIGS. 6A to 6C which are the same as those in the first embodiment signify the same parts, and the description thereof will be omitted for brevity.

In the third embodiment, as compared with the arrangement of the image pickup apparatus according to the second embodiment, the electric circuit board 112b and the image pickup lens 101 are disposed oppositely in the right- and left-hand directions with respect to the photographing direction. In the case of the image pickup apparatus according to the third embodiment, the distance P3 between the image pickup lens optical axis 109 and the center line 119 of the display screen 114a is very short as shown in FIG. 6A. Thus, the parallax is low, and the photographing becomes easy. In addition, since the optical axis is bent downwardly by the prism 2 so that the light is incident on the CCD 1a, the surface of the monitor 114 and the surface of the CCD 1a do not become parallel with each other, so that the CCD 1a is insusceptible to the heat of the backlight 114b of the monitor 114.

Besides, the third embodiment can also offer effects similar to those of the first embodiment.

Fourth Embodiment

FIGS. 7A to 7C are illustrations of a structure of an image pickup apparatus according to a fourth embodiment of the invention. Except for a battery 113b, the reference numerals used in FIGS. 6A to 6C which are the same as those in the first embodiment signify the same parts, and the description thereof will be omitted for brevity. As compared with the battery 113 shown in FIGS. 3A to 3C, in the battery 113b, the dimension in the L1 directions is the same, but the dimension in the V1 directions is longer so that the amount of power is large. Even if such a battery with a large capacity is set, the portability and the convenience in storage are maintainable, and the fourth embodiment can provide effects similar to those of the first embodiment.

Fifth Embodiment

FIGS. 8A to 8C are illustrations of a structure of an image pickup apparatus according to a fifth embodiment of the invention, and FIGS. 9A and 9B are illustrations of a state of photographing through the use of the image pickup apparatus according to the fifth embodiment. The reference numerals used in FIGS. 8A to 8C and FIGS. 9A and 9B which are the same as those in FIGS. 3A to 3C signify the same parts, and the description thereof will be omitted for simplicity.

In the fifth embodiment, the battery 113 is disposed under the monitor 114. Thus, the center of gravity of the image pickup apparatus shifts to a lower position, and therefore, without impairing the effects of the first embodiment, the size reduction of the apparatus is achievable and the stable photography is feasible.

Sixth Embodiment

FIGS. 10A to 10C show a structure of an image pickup apparatus according to a sixth embodiment of the invention. In the arrangement of the image pickup apparatus according to the sixth embodiment, the recording/reproducing section 111 is disposed on the side opposite to the photographing direction side. The reference numerals used in FIGS. 10A to 10C which are the same as those in FIGS. 3A to 3C signify the same parts, and the description thereof will be omitted for simplicity.

This structure can provide effects similar to those of the fifth embodiment.

Seventh Embodiment

FIGS. 11A to 11C illustrate a structure of an image pickup apparatus according to a seventh embodiment of the invention. In the arrangement of the image pickup apparatus according to the seventh embodiment, as compared with the arrangement of the image pickup apparatus shown in FIGS. 8A to 8C, in the image pickup apparatus according to the seventh embodiment, the image pickup lens 101 and the electric circuit board 112b are disposed oppositely in the right- and left-hand directions when viewed from the subject side. The reference numerals used in FIGS. 11A to 11C which are the same as those in FIGS. 3A to 3C signify the same parts, and the description thereof will be omitted for simplicity.

This arrangement can also offer the same effects as those of the fifth embodiment.

Eighth Embodiment

Figure 12A:
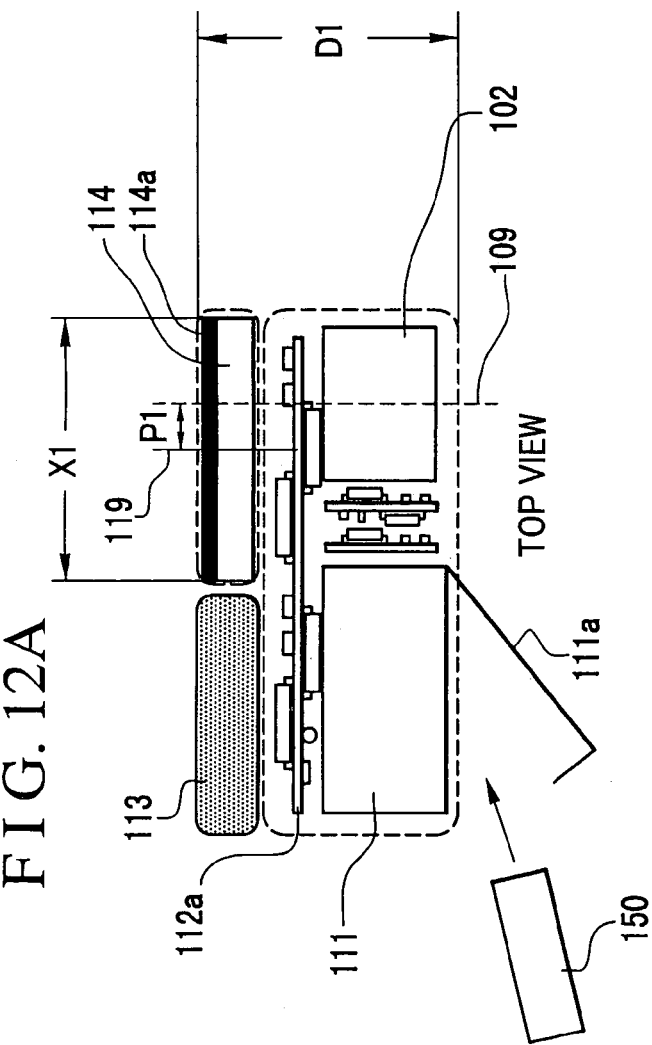
FIGS. 12A to 12C are illustrations of an image pickup apparatus according to an eighth embodiment of the invention.
Figure 12C:
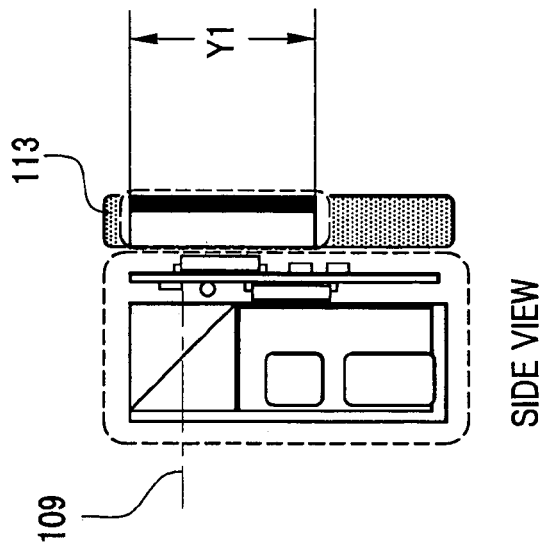
Figure 12B:
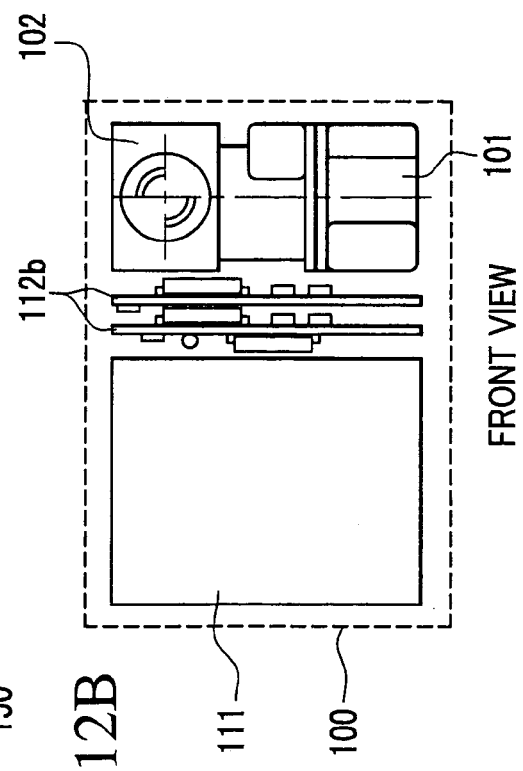

FIGS. 12A to 12C show a structure of an image pickup apparatus according to an eighth embodiment of the invention, and FIGS. 13A and 13B are illustrations of a state of photographing through the use of the image pickup apparatus according to the eighth embodiment. The reference numerals used in FIGS. 12A to 12C and FIGS. 13A and 13B which are the same as those in FIGS. 3A to 3C denote the same parts, and the description thereof will be omitted for simplicity.

As shown in FIGS. 12A to 12C and FIGS. 13A and 13B, the battery 113 is placed on a side surface of the image pickup apparatus body to be in parallel to the monitor 114. In the arrangement of this image pickup apparatus, the image pickup lens 101, the recording/reproducing section 111, the monitor 114 and the battery 113 contribute most of the weight of the whole image pickup apparatus. Accordingly, when the battery 113 is disposed on the side surface of the image pickup apparatus body to be in parallel to the monitor 114 and the recording/reproducing section 111 is located symmetrically with the image pickup lens 101 in the right- and left-hand directions, the center of gravity of the image pickup apparatus is substantially positioned at the center of the image pickup apparatus. For this reason, it is possible to provide an image pickup apparatus with an excellent weight balance, and the movement of the hand decreases and the apparatus becomes easy to hold, thereby providing an image pickup apparatus with an excellent operability. In addition, since the monitor 114 is placed on the rear surface of the image pickup lens 101, the parallax is low. Further, since the optical axis is bent downwardly by the prism 102 so that the light is incident upon the CCD 1a, the surface of the monitor 114 and the surface of the CCD 1a are not in parallel to each other, with the result that the CCD 1a is insusceptible to the heat of the backlight 114b of the monitor 114. For this reason, a member for blocking the heat is unnecessary, thus allowing the thickness reduction.

Ninth Embodiment

Figure 14A:
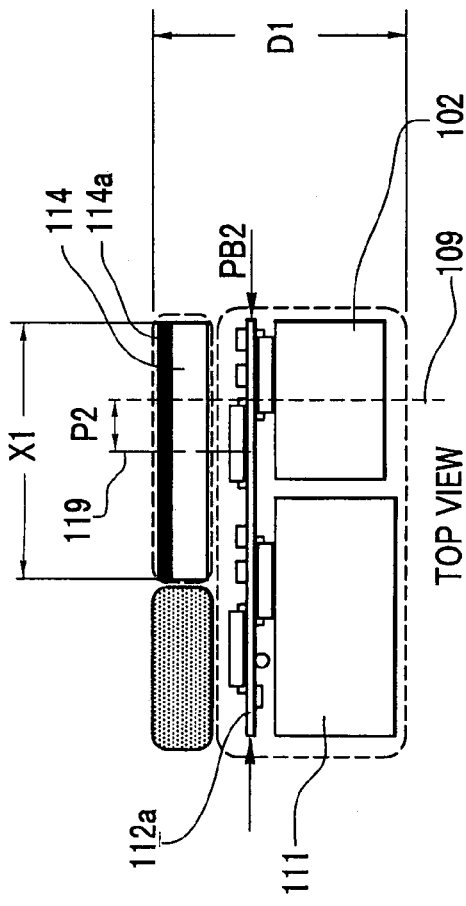
FIGS. 14A to 14C are illustrations of an image pickup apparatus according to a ninth embodiment of the invention.
Figure 14C:
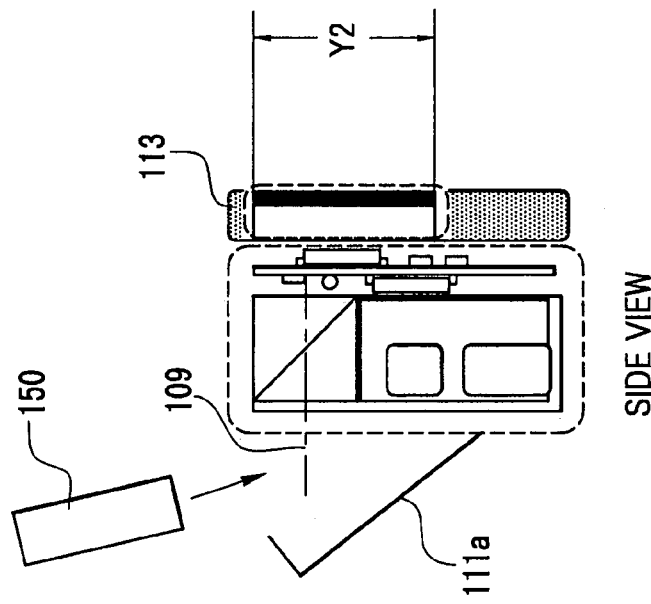
Figure 14B:
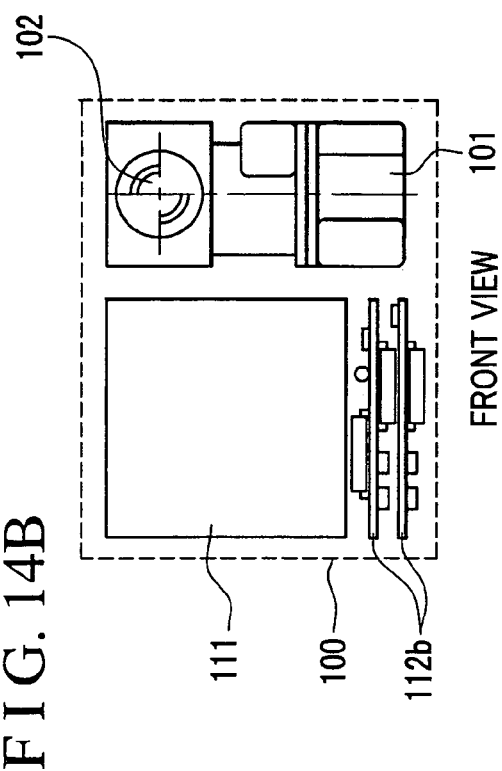

FIGS. 14A to 14C show a structure of an image pickup apparatus according to a ninth embodiment of the invention. In the ninth embodiment, as shown in FIGS. 14A to 14C, the electric circuit board 112b is disposed under the recording/reproducing section 111. This arrangement can also offer the same effects as those of the eighth embodiment.

The reference numerals used in FIGS. 14A to 14C which are the same as those in FIGS. 3A to 3C signify the same parts, and the description thereof will be omitted for simplicity.

Tenth Embodiment

Figure 15C:
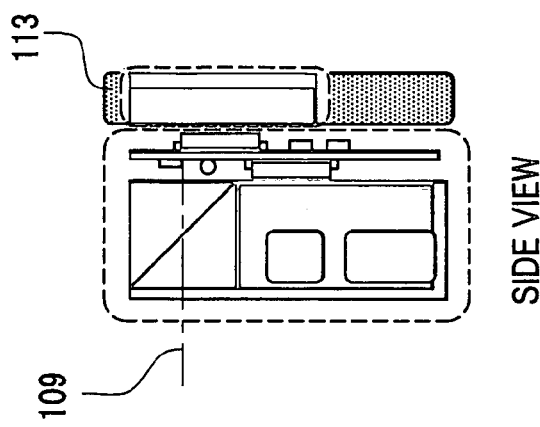
FIGS. 15A to 15C are illustrations of an image pickup apparatus according to a tenth embodiment of the invention.
Figure 15A:
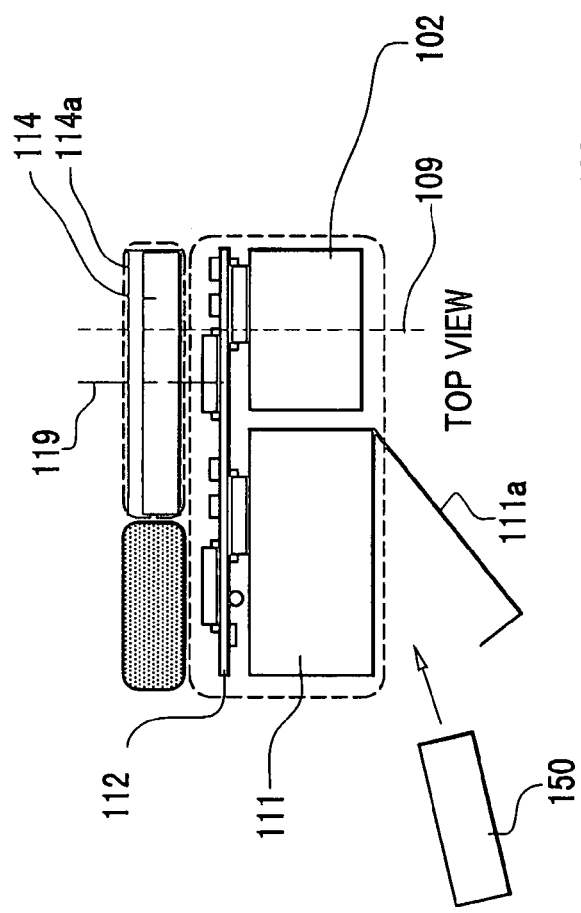
Figure 15B:
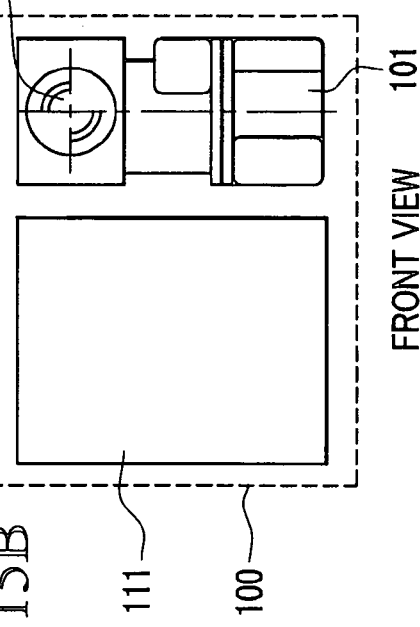

FIGS. 15A to 15C show a structure of an image pickup apparatus according to a tenth embodiment of the invention. Although the electric circuit boards are placed as two portions separately disposed in the eighth embodiment, in the tenth embodiment, as shown in FIGS. 15A to 15C, the electric circuit board 112 is constructed as one configuration on the rear surface in the photographing direction. This construction can provide the same effects of those of the eighth embodiment.

The reference numerals used in FIGS. 15A to 15C which are the same as those in FIGS. 3A to 3C signify the same parts, and the description thereof will be omitted for simplicity.

Eleventh Embodiment

FIGS. 16A to 16C show an arrangement of an image pickup apparatus according to an eleventh embodiment of the invention. As compared with the eighth embodiment, in the eleventh embodiment, as shown in FIGS. 16A to 16C, the image pickup lens 101 and the electric circuit board 112b are interchanged in location. This arrangement can produce the same effects as those of the eighth embodiment.

The reference numerals used in FIGS. 16A to 16C which are the same as those in FIGS. 3A to 3C signify the same parts, and the description thereof will be omitted for simplicity.

Twelfth Embodiment

Figure 17A:
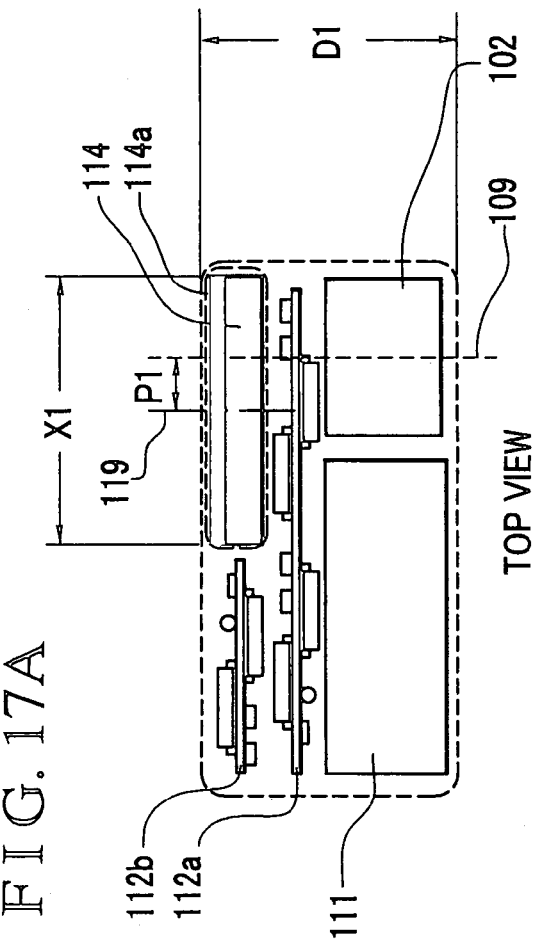
FIGS. 17A to 17C are illustrations of an image pickup apparatus according to a twelfth embodiment of the invention.
Figure 17C:
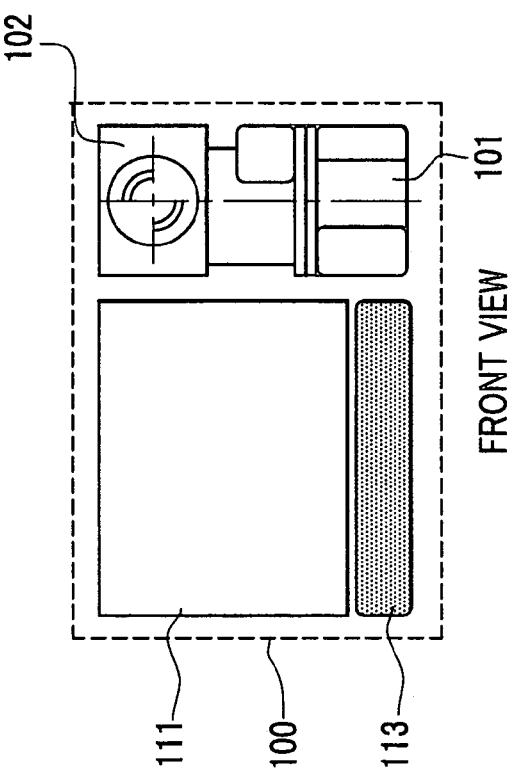
Figure 17B:
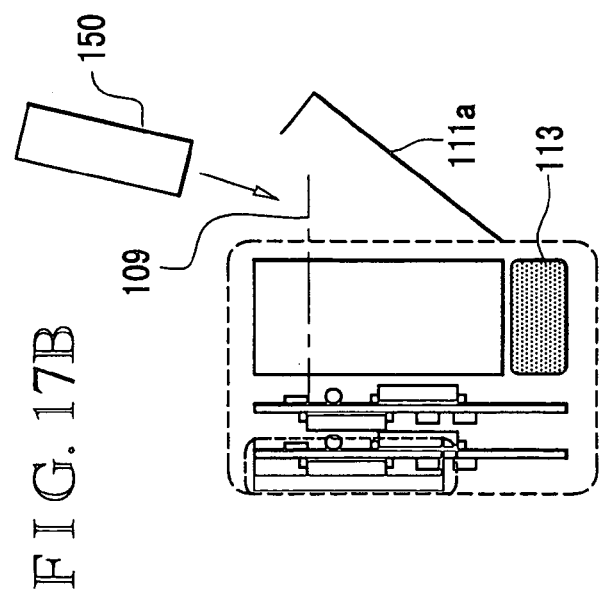
Figure 18A:
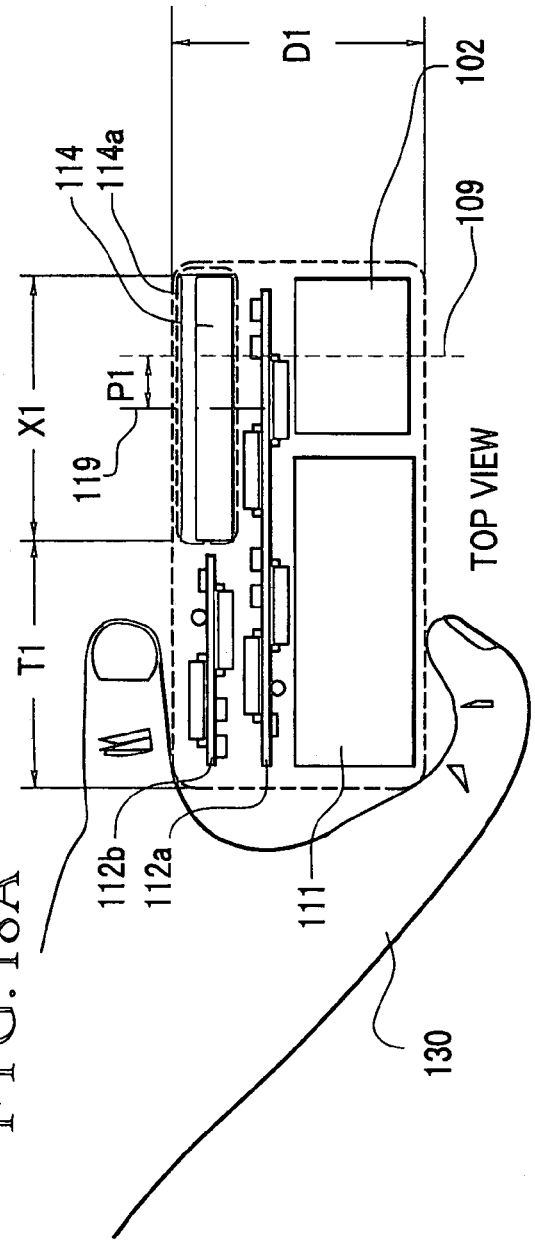
FIGS. 18A and 18B are illustrations of photographing states of the image pickup apparatus according to the twelfth embodiment.
Figure 18B:
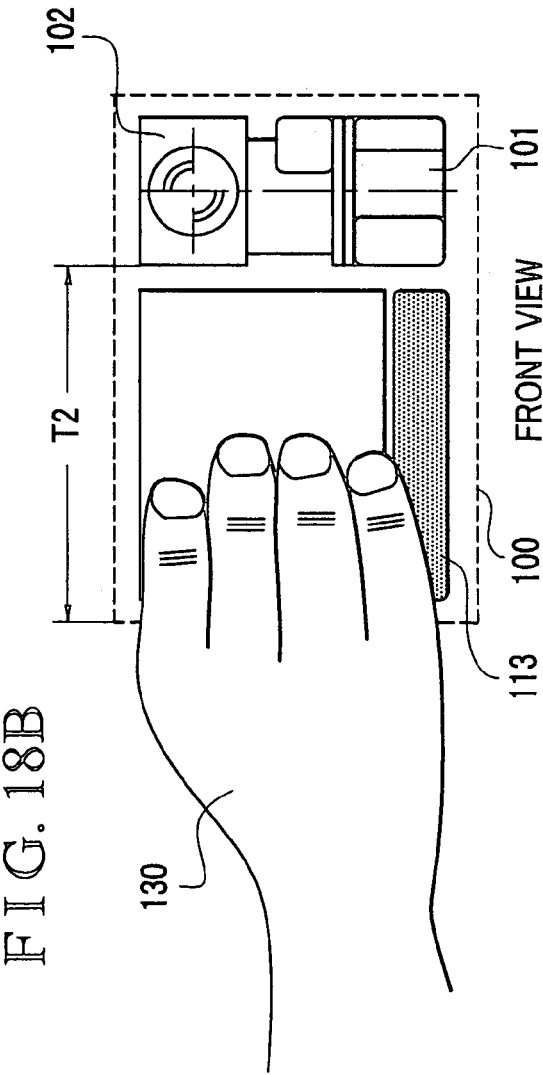

FIGS. 17A to 17C show a structure of an image pickup apparatus according to a twelfth embodiment of the invention, and FIGS. 18A and 18B illustrate a state of photographing through the use of the image pickup apparatus according to the twelfth embodiment.

In the twelfth embodiment, as shown in FIGS. 17A to 17C, the battery 113 is disposed under the recording/reproducing section 111, and the electric circuit board 112a is constructed using one circuit board. Whereupon, the connectors, the wire harness and other components which are required when the circuit board is divided become unnecessary, and the electric parts such as an IC can effectively arranged. This structure can offer the effects similar to those of the first embodiment.

The reference numerals used in FIGS. 17A to 17C which are the same as those in FIGS. 3A to 3C signify the same parts, and the description thereof will be omitted for simplicity.

Thirteenth Embodiment

Figure 19A:
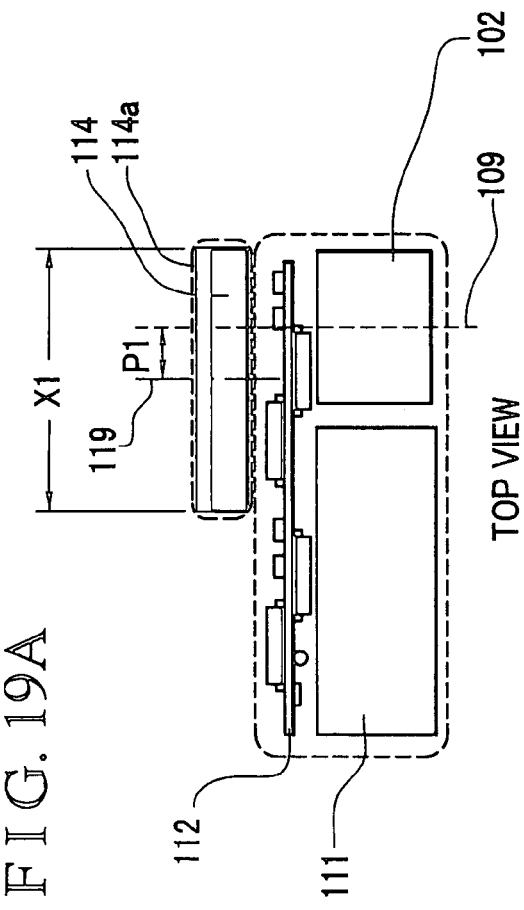
FIGS. 19A to 19C are illustrations of an image pickup apparatus according to a thirteenth embodiment of the invention.
Figure 19C:
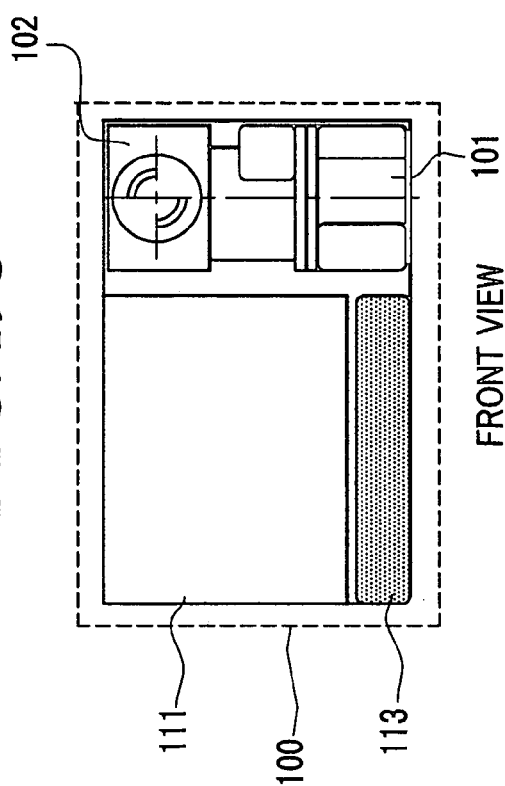
Figure 19B:
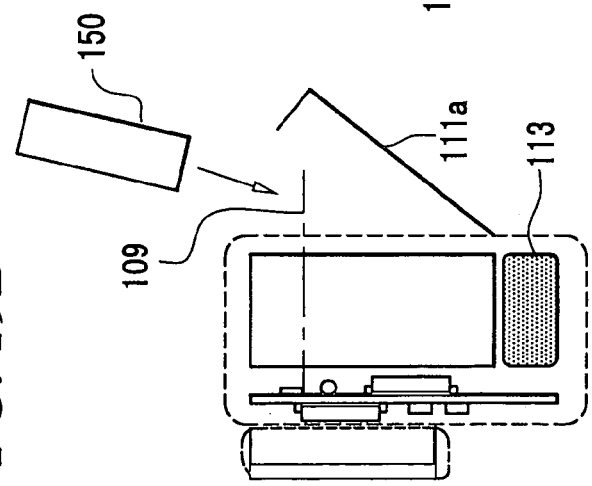

FIGS. 19A to 19C illustrate a structure of an image pickup apparatus according to a thirteenth embodiment of the invention. In the thirteenth embodiment, the electric circuit boards 112a and 112b shown in FIGS. 17A to 17C are constructed as one electric circuit board. Thus, the disposition of the electronic parts is more effectively possible. The thirteenth embodiment can achieve effects similar to those of the first embodiment.

The reference numerals used in FIGS. 19A to 19C which are the same as those in FIGS. 3A to 3C signify the same parts, and the description thereof will be omitted for simplicity.

Fourteenth Embodiment

FIGS. 20A to 20C show a structure of an image pickup apparatus according to a fourteenth embodiment of the invention. In the fourteenth embodiment, a battery 113 having a large capacity is disposed under the recording/reproducing section 111. This structure can also provide effects similar to those of the twelfth embodiment.

The reference numerals used in FIGS. 20A to 20C which are the same as those in FIGS. 3A to 3C signify the same parts, and the description thereof will be omitted for simplicity.

Fifteenth Embodiment

Figure 21A:
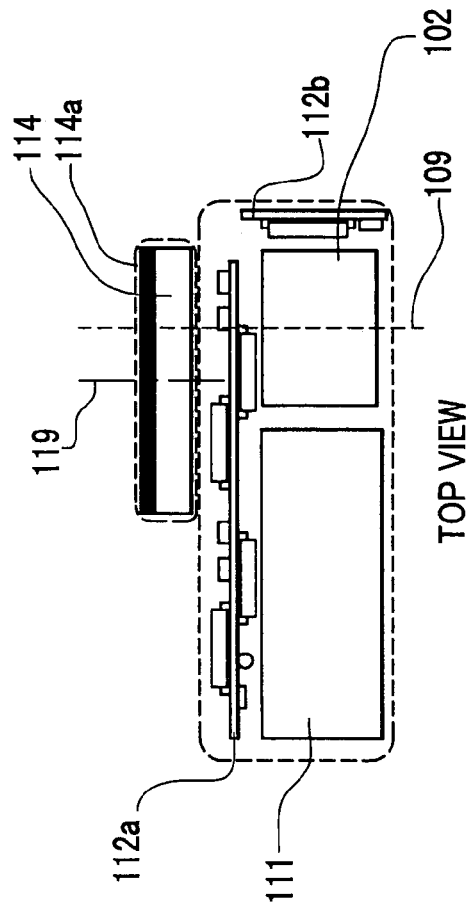
FIGS. 21A to 21C are illustrations of an image pickup apparatus according to a fifteenth embodiment of the invention.
Figure 21C:
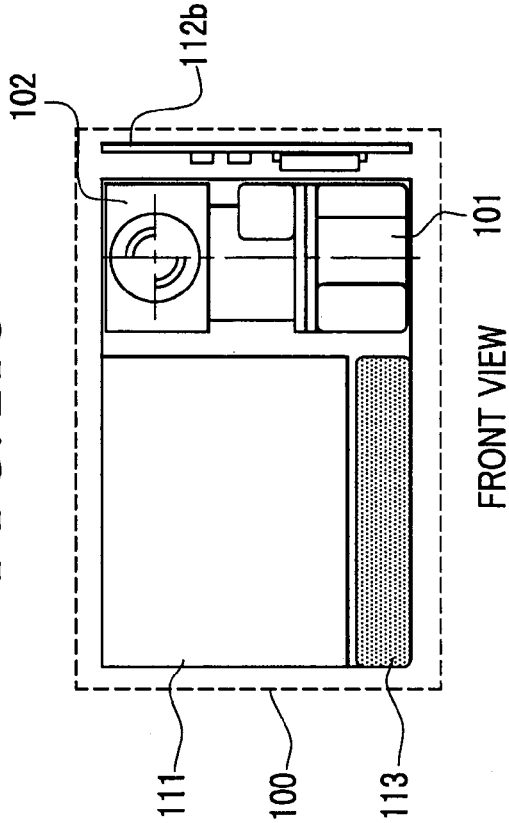
Figure 21B:
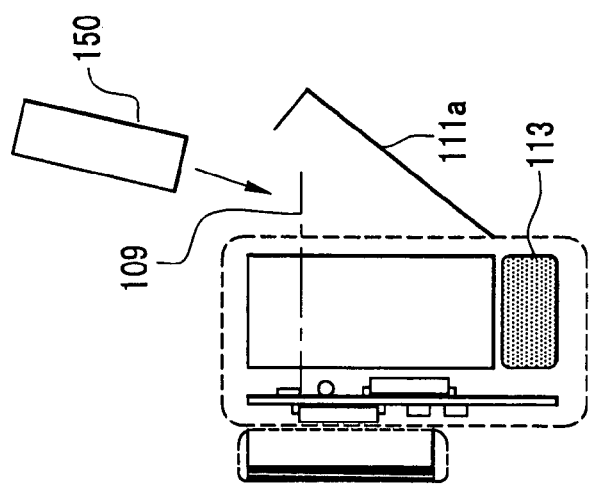

FIGS. 21A to 21C show a structure of an image pickup apparatus according to a fifteenth embodiment of the invention. In the fifteenth embodiment, the electric circuit board 112b shown in FIGS. 17A to 17C is disposed to be adjacent to the image pickup lens 101. This structure can also offer effects similar to those of the twelfth embodiment.

The reference numerals used in FIGS. 21A to 21C which are the same as those in FIGS. 3A to 3C signify the same parts, and the description thereof will be omitted for simplicity.

Sixteenth Embodiment

Figure 22C:
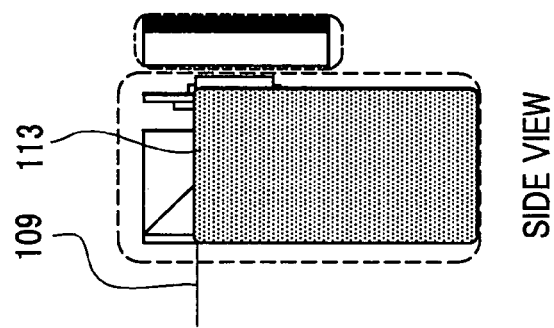
FIGS. 22A to 22C are illustrations of an image pickup apparatus according to a sixteenth embodiment of the invention.
Figure 22A:
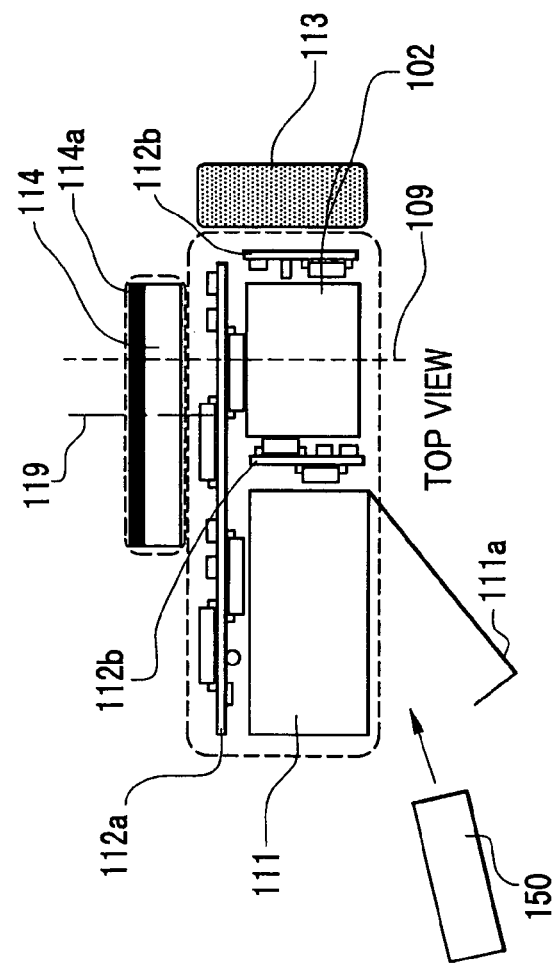
Figure 22B:
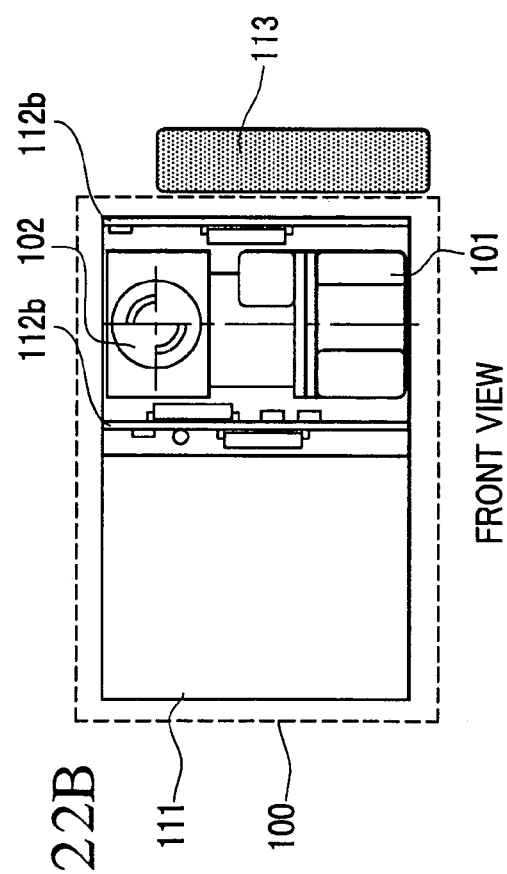
Figure 23A:
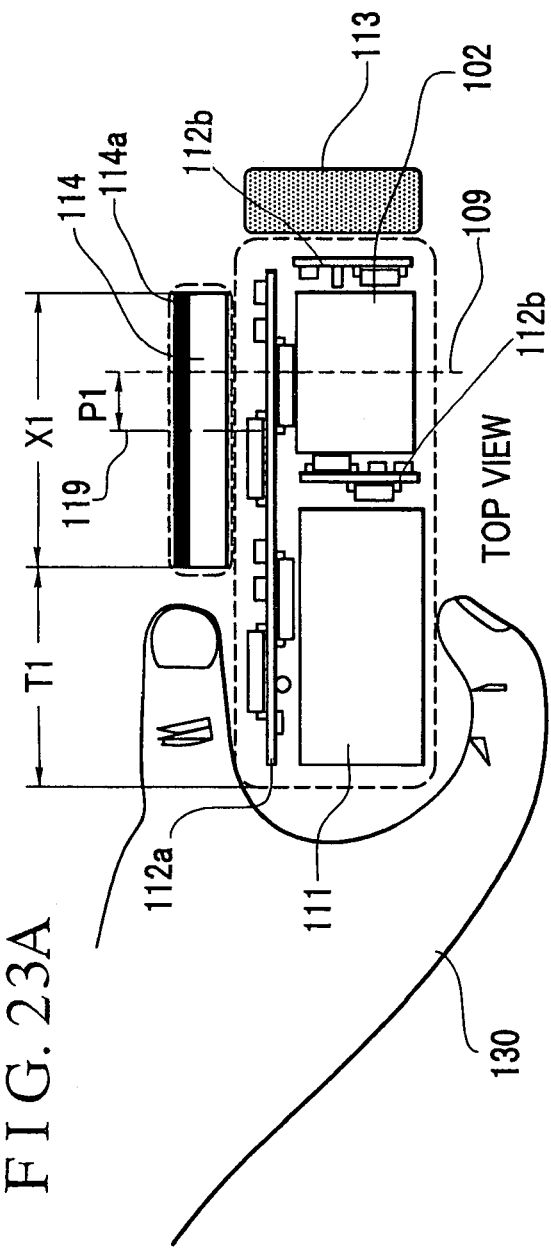
FIGS. 23A and 23B are illustrations of photographing states of the image pickup apparatus according to the sixteenth embodiment.
Figure 23B:
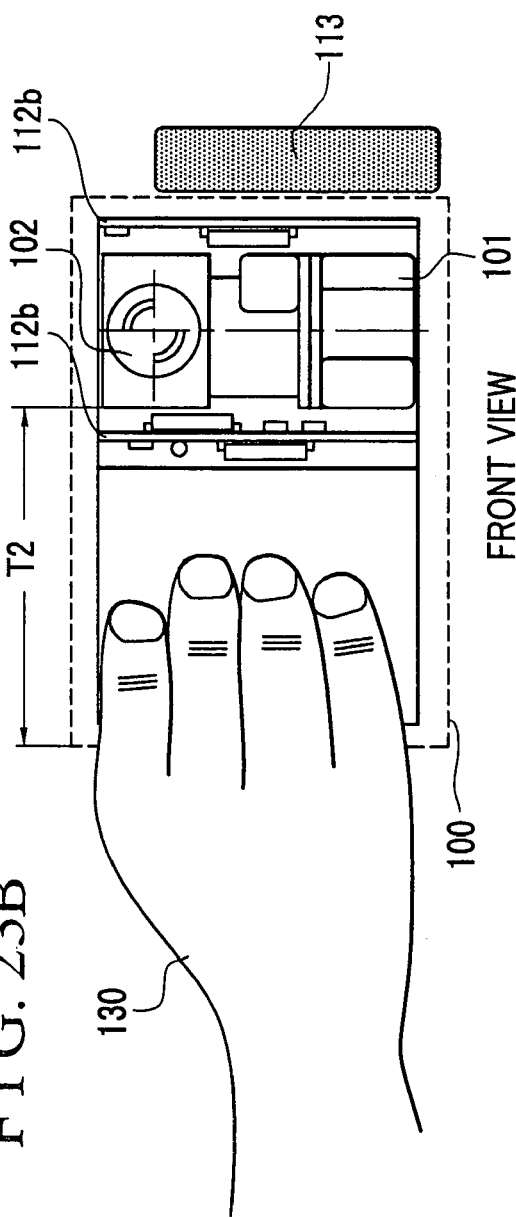

FIGS. 22A to 22C show an arrangement of an image pickup apparatus according to a sixteenth embodiment of the invention, and FIGS. 23A and 23B are illustrations of a state of the use of the image pickup apparatus according to the sixteenth embodiment. In the sixteenth embodiment, the electric circuit board 112a is constructed as one circuit board, and the electric circuit board 112b is placed along or on each of both the side surfaces of the image pickup lens 109. In addition, the battery 113 is located on a side surface of the image pickup apparatus. This arrangement can also offer effects similar to those of the twelfth embodiment.

The reference numerals used in FIGS. 22A to 22C and FIGS. 23A and 23B which are the same as those in FIGS. 3A to 3C signify the same parts, and the description thereof will be omitted for simplicity.

Seventeenth Embodiment

FIGS. 24A to 24C show a structure of an image pickup apparatus according to a seventeenth embodiment of the invention. In the seventeenth embodiment, the electric circuit board 112b is situated below the recording/reproducing section 111. In addition, the battery 113 is located on a side surface of the image pickup apparatus. This structure can also effects similar to those of the twelfth embodiment.

The reference numerals used in FIGS. 24A to 24C which are the same as those in FIGS. 3A to 3C signify the same parts, and the description thereof will be omitted for simplicity.

Eighteenth Embodiment

Figure 25C:
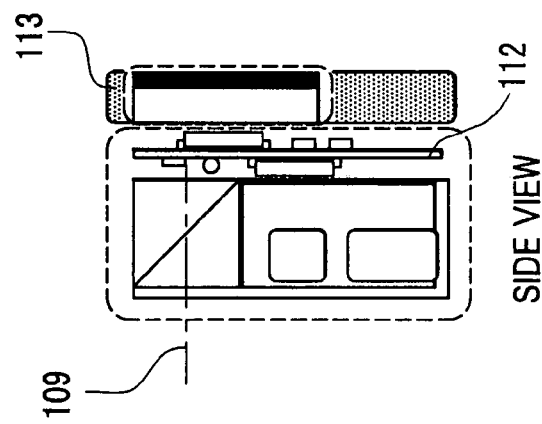
FIGS. 25A to 25C are illustrations of an image pickup apparatus according to an eighteenth embodiment of the invention.
Figure 25A:
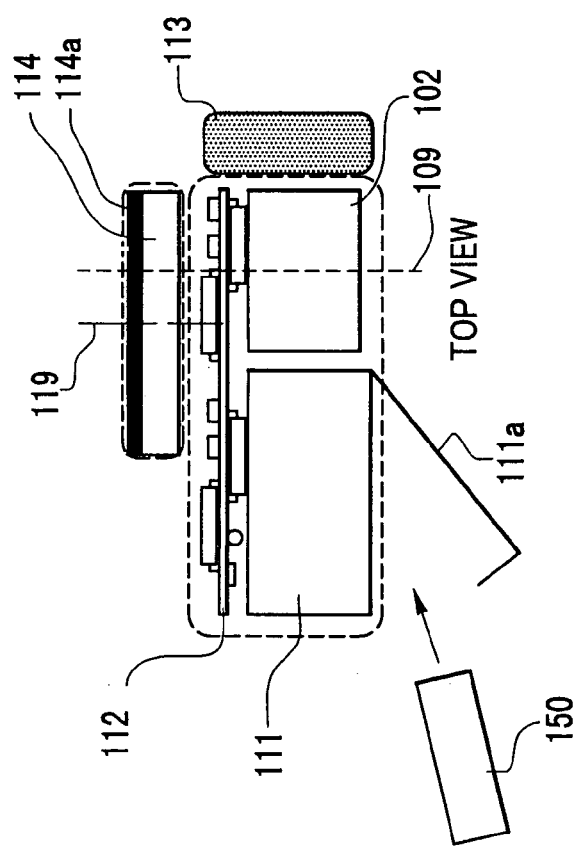
Figure 25B:
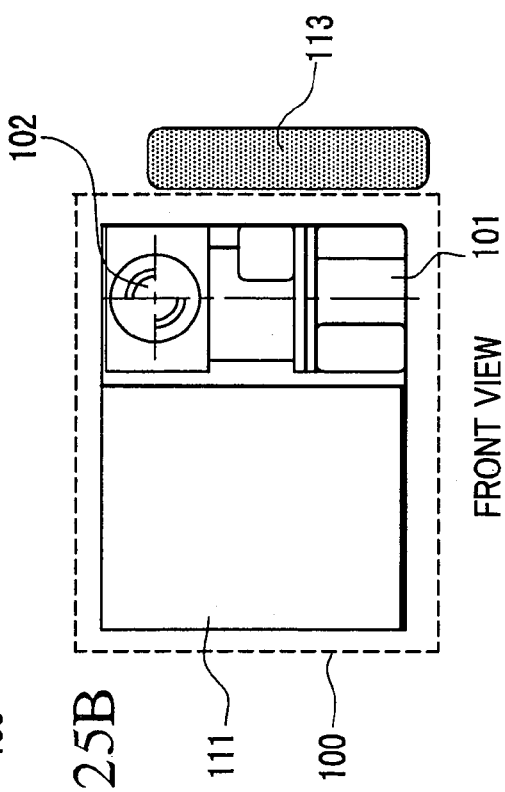
Figure 26:
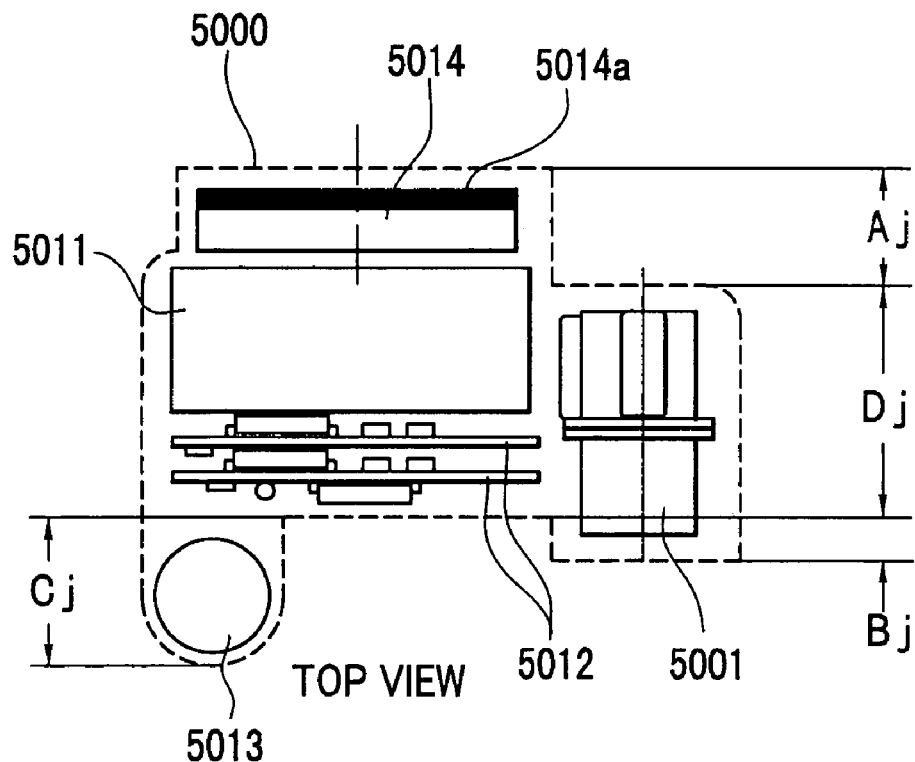
FIG. 26 is an illustration of an arrangement of a conventional image pickup apparatus.
Figure 27:
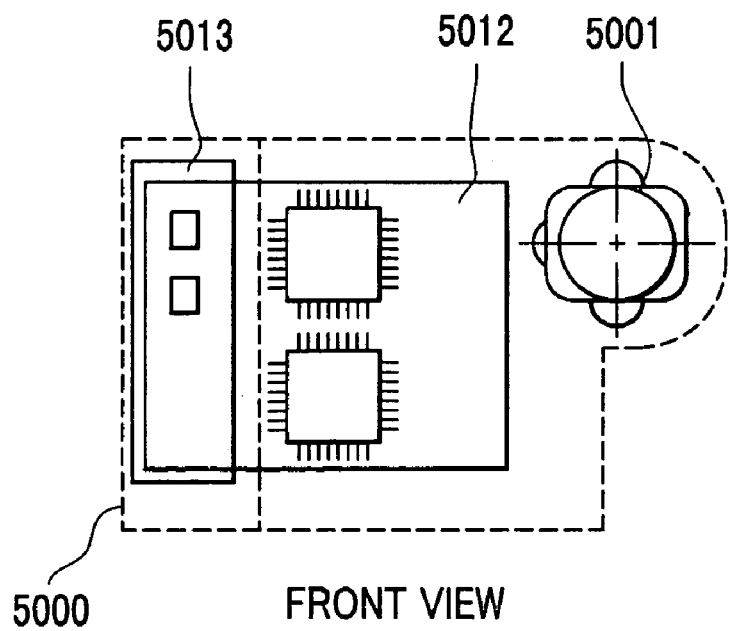
FIG. 27 is an illustration of the arrangement of the conventional image pickup apparatus.
Figure 28A:
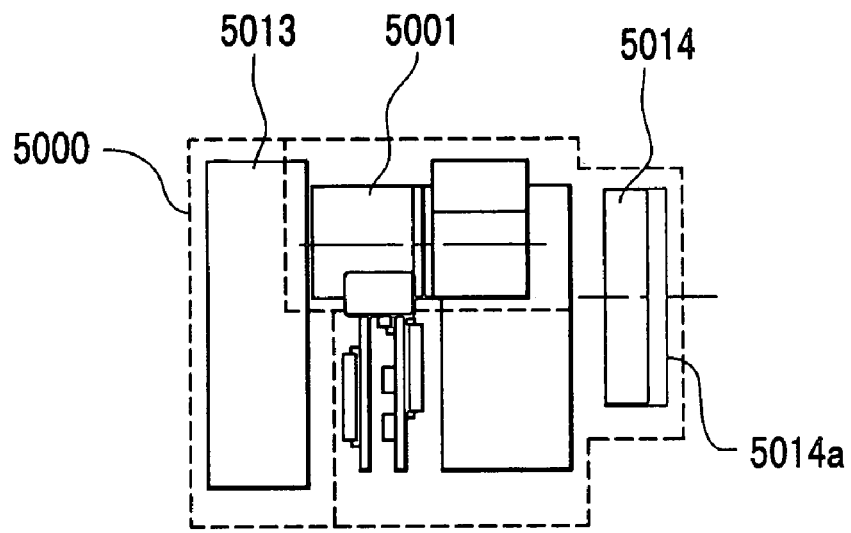
FIGS. 28A and 28B are illustrations of the arrangement of the conventional image pickup apparatus.
Figure 28B:
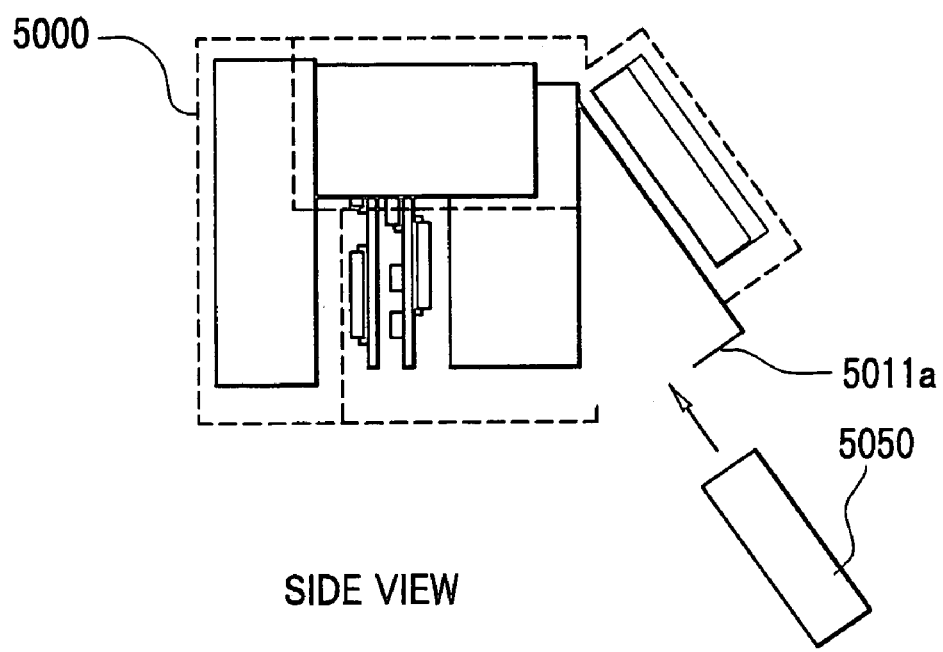
Figure 29A:
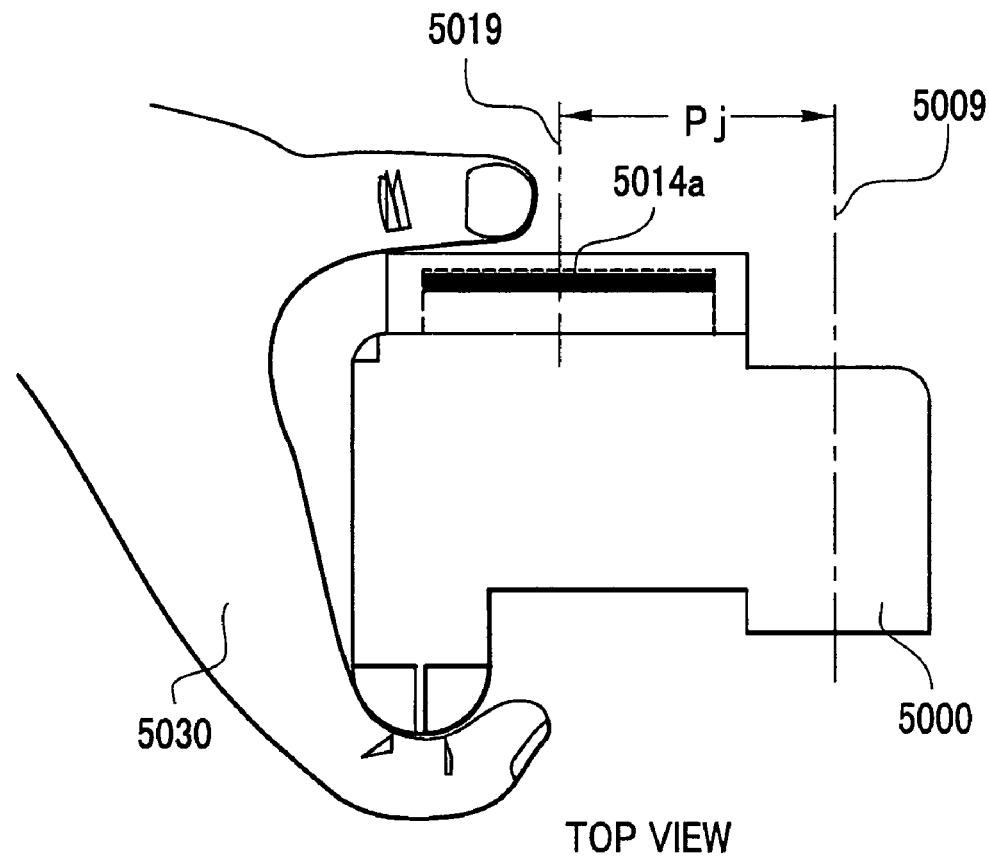
FIGS. 29A and 29B are illustrations of photographing states of the conventional image pickup apparatus.
Figure 29B:
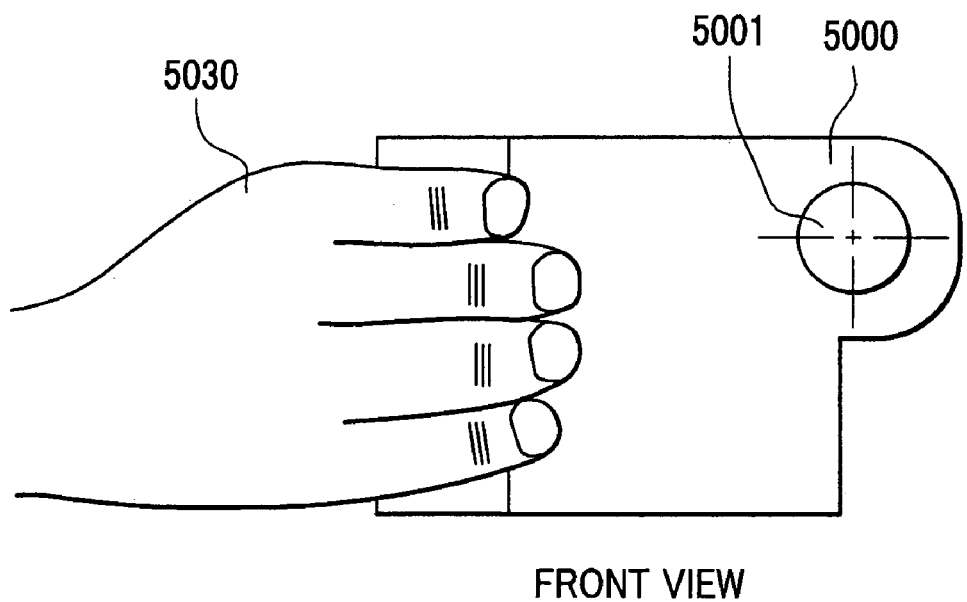

FIGS. 25A to 25C illustrate an arrangement of an image pickup apparatus according to an eighteenth embodiment of the invention. In the eighteenth embodiment, as shown in FIGS. 25A to 25C, the electric circuit boards are collected as one circuit board 112. In addition, the battery 113 is disposed on a side surface of the image pickup apparatus. This arrangement can offer effects similar to those of the twelfth embodiment.

The reference numerals used in FIGS. 25A to 25C which are the same as those in FIGS. 3A to 3C signify the same parts, and the description thereof will be omitted for simplicity.

According to each of the first to eighteenth embodiments, since the recording/reproducing section, the battery, the electric circuit boards, and the display section are disposed as described above, it is possible to eliminate the irregularities of the image pickup apparatus body. Accordingly, the convenience in encasement and the portability improve and the thickness reduction is possible, and an image pickup apparatus with an extremely good operability is attainable.

Nineteenth Embodiment

Figure 30:
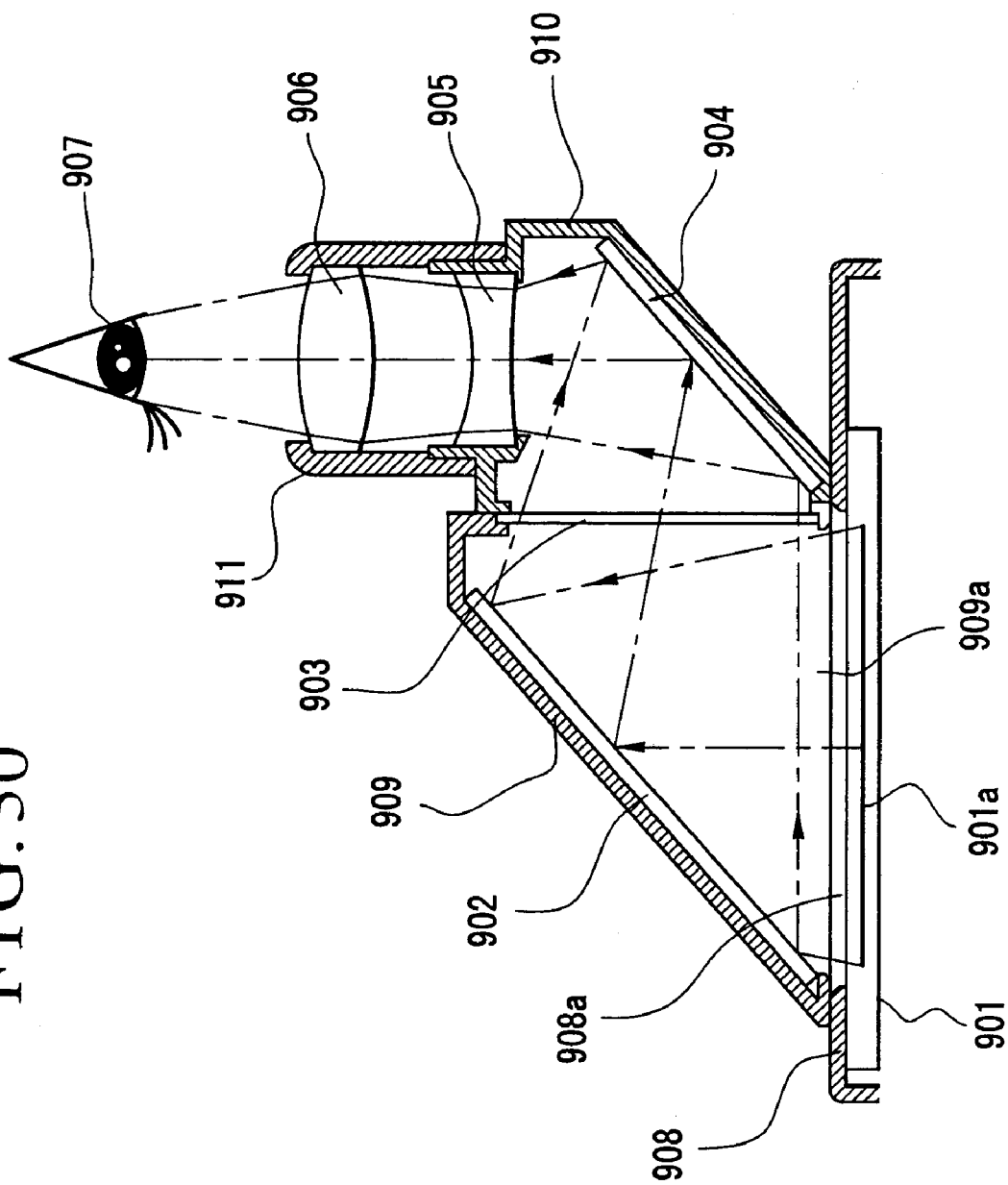
FIG. 30 is a side-elevational cross-sectional view showing a viewfinder of an image pickup apparatus according to a nineteenth embodiment of the invention.

FIG. 30 is a side-elevational cross-sectional view showing a structure of a viewfinder of an image pickup apparatus according to a nineteenth embodiment of the invention. In FIG. 30, reference numeral 901 represents a liquid crystal panel whose size is several inches and which is placed on a top surface or the like of a camera body, and reference numeral 902 designates a first reflecting mirror located obliquely to face the liquid crystal panel 901. The first reflecting mirror 902 is placed at an angle of 45 degrees or less with respect to a display screen 901a of the liquid crystal panel 901. Further, reference numeral 903 denotes a colorless and transparent cover glass vertically which is provided at an end portion of the display screen 901a and which allows the light from the first reflecting mirror 902 to pass. Still further, reference numeral 904 depicts a second reflecting mirror disposed in parallel to the first reflecting mirror 902 to receive the outgoing light from the first reflecting mirror 902. In the first reflecting mirror 902 and the second reflecting mirror 904, their reflecting surfaces are formed with a vapor-deposited film made of silver, aluminum or the like.

In addition, reference numeral 905 represents a negative lens located in the outgoing optical path from the second reflecting mirror 904, reference numeral 906 denotes a positive lens situated after the negative lens 905, and reference numeral 907 signifies an eye of the photographer who views an image obtained through the positive lens 906. Further, reference numeral 908 stands for an exterior cover for the liquid crystal panel 901, which has a window section 908a being an opening made so that the display screen 901a of the liquid crystal panel 901 is visible. Still further, reference numeral 909 represents a first eyepiece section cover, with the first reflecting mirror 902 being attached to its inner surface. The first eyepiece section cover 909 has an entrance window 909a for a light beam from the liquid crystal panel 901. Still further, reference numeral 910 designates a second eyepiece section cover for holding the second reflecting mirror 904 and the negative lens 905. Moreover, reference numeral 911 denotes a lens barrel for holding the positive lens 906, which is coupled to the second eyepiece section cover 910. In this structure, the first reflecting mirror 902, the second reflecting mirror 904, the negative lens 905 and the positive lens 906 constitute an eyepiece lens section.

In the viewfinder having the structure shown in FIG. 30, when the image on the display screen 901a of the liquid crystal panel 901 is viewed directly from a position remoter than the camera body, that is, in the case of the viewfinder being used as a monitor, the eyepiece lens section is detached from the liquid crystal panel 901. Whereupon, the obstacle disappears from the display screen 901a of the liquid crystal panel 901, and therefore, the photographer can not only view the display screen 901a from the just front side through the eye 907 but also see it from oblique directions.

On the other hand, in the case of the viewfinder being used as an eyepiece type, the eyepiece lens section is fitted to the exterior cover 908, as in the state shown in FIG. 30. At this time, a claw portion (not shown) formed on the first eyepiece section cover 909 engages with a hole (not shown) made in the exterior cover 908, so that the eyepiece lens section is positioned with respect to the exterior cover 908 and concurrently fixed there. The light beam about the image on the display screen 901a of the liquid crystal panel 901 is incident upon the first reflecting mirror 902. Since the angle of the first reflecting mirror 902 made with respect to the display screen 901*a* is set to be 45 degrees or less, the light beam reflected from the first reflecting mirror 902 advances rightwardly, obliquely and downwardly, and then passes through the cover glass 903 substantially vertically placed to reach the second reflecting mirror 904. Since the second reflecting mirror 904 is disposed to be in parallel with the first reflecting mirror 902, the incident light is vertically reflected to be incident upon the negative lens 905. The light beam from the second reflecting mirror 904 forms an image on the retina of the eye 907 of the photographer through the negative lens 905 and the positive lens 906.

Figure 31:
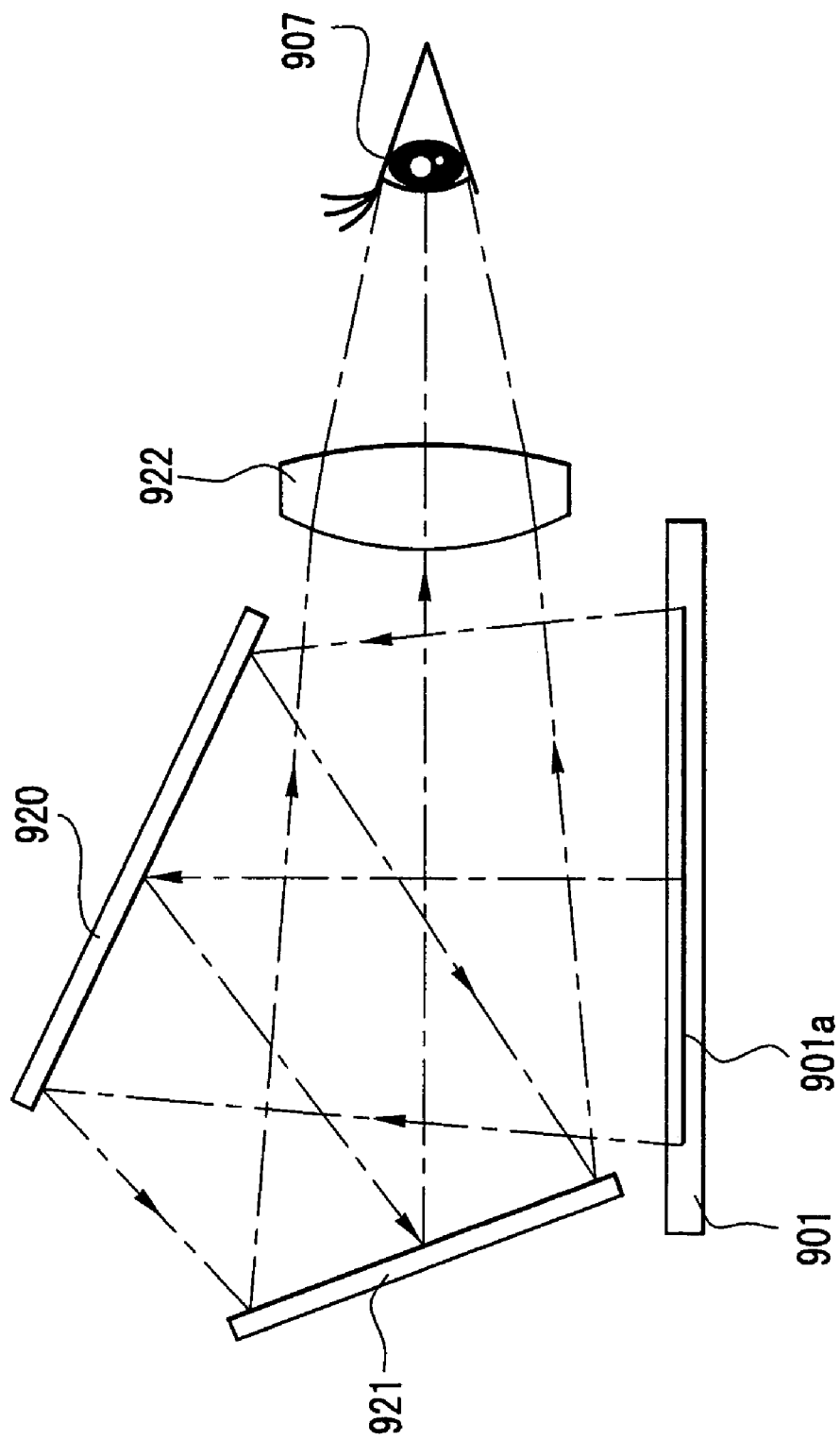
FIG. 31 illustratively shows a structure of a conventional viewfinder.

In the case of the eyepiece optical system comprising a negative lens and a positive lens as shown in FIG. 30, since the positions of the front-side principal point and the rear-side principal point can be reversed, as compared with a structure comprising one convex lens shown in FIG. 31, even if the magnification and diopter are set equally, it is possible to shorten the distance from the display screen 901*a* to the eye 907 of the photographer, that is, the overall length of the optical path. However, if this optical system comprising the negative lens and the positive lens is put after the combination of mirrors shown in FIG. 31, the distance from the display screen 901*a* to the negative lens 905 comes to approximately half of the focal length, and hence, it is impossible to dispose it at a position not hindering the light beam from the liquid crystal panel 901 to the first mirror 921 in FIG. 31. That is, only in the case of the optical path configuration based upon two reflections by two reflecting mirrors disposed so that the angle made with respect to the display screen 901*a* is 45 degrees or less, a compact eyepiece lens section is obtainable.

Meanwhile, one of significant problems arising with the construction of the eyepiece lens section is the invasion of dust or the like. In the case of the eyepiece lens section with the structure shown in FIG. 30, the space from the cover glass 903 to the negative lens 905 is hermetically sealed by them and the second eyepiece section cover 910. In addition, the space between the negative lens 905 and the positive lens 906 is also hermetically sealed by the second eyepiece section cover 910 and the lens barrel 911, and therefore, there is no possibility that the dust or the like invades. Accordingly, the dust or the like coming from the external is attached to the reflection surface of the first reflecting mirror 902 or the surface of the cover glass 903 facing the first reflecting mirror 902. In this case, if the dust or the like is wiped by cloth or the like through the entrance window 909*a* of the first eyepiece section cover 909 after the eyepiece lens section is detached from the monitor section, it is easily removable. Besides, since the first reflecting mirror 902 and the cover glass 903 are separated from the display screen 901*a* in some degree, if the dust or the like attached thereto has microscopic sizes, the eye 907 of the photographer viewing the image through the eyepiece lens section hardly notices the dust or the like, so that it is not always required to remove the dust or the like.

In the case of the conventional mirror combination shown in FIG. 31, a dust-proof cover glass (not shown in FIG. 31) is generally put just above the liquid crystal panel 901 to be in parallel with the display screen 901*a*. In this case, even if the dust or the like attached onto the surface of the cover glass has microscopic sizes, because of being close to the display screen 901*a*, it is noticeable, and since the cover glass is in parallel to the display screen 901*a*, the light beam reflected from the surface of the cover glass is again reflected from the display screen 901*a* to reach the eye 907 of the photographer, and hence, the double-image phenomenon tends to occur. Moreover, since the cover glass is needed to have substantially the same size as that of the display screen 901*a*, the eyepiece lens section increases in weight.

On the other hand, according to the nineteenth embodiment shown in FIG. 30, the cover glass 903 is put between the first reflecting mirror 902 and the second reflecting mirror 904, and therefore, as compared with the conventional arrangement, the cover glass 903 can assume an extremely small size, and if the angle of the cover glass 903 substantially makes the right angle, the incident light beam comes obliquely, with the result that the double-image phenomenon, the ghost and others are hard to produce.

According to the nineteenth embodiment, since the optical system of the viewfinder is made up of the first reflecting mirror placed on the display screen at an angle of 45 degrees or less with respect to the display screen, the second reflecting mirror disposed in parallel with the first reflecting mirror and made to reflect the light beam from the first reflecting mirror in the direction parallel with the incident light on the first reflecting mirror, and the eyepiece lens comprising the negative lens and the positive lens for forming an image of the light beam from the second reflecting mirror on a predetermined position, a viewfinder for an image pickup apparatus, which is small in volume and light in weight, is attainable. In addition, it is possible to suppress that the contamination of the optical elements due to the dust or the like has influence on the image in the visual-field.

Furthermore, by employing the optical system in which the transparent member is put between the first reflecting mirror and the second reflecting mirror for partitioning therebetween, the invading dust or the like is attached to only the surfaces of the first reflecting mirror and the transparent member, so that it can easily be cleaned by hand, and the maintenance is easy.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:
1. An image pickup apparatus, comprising:
a first optical system which turns a light axis from a first direction to a second direction;
a second optical system which is disposed in the second direction with respect to said first optical system;
an image pickup element that converts a subject image which passes through said first optical system and said second optical system into an electrical signal;
a display screen that is disposed in a rear side of said image pickup apparatus; and
a battery portion,
wherein
a center of a third direction of said first optical system and a center of the third direction of said second optical system are closer to a first end than the center of the center of the third direction of said image pickup apparatus and the first end that is one end of the third direction of said image pickup apparatus,
the center of the second direction of said first optical system is closer to a second end than the center of the center of the second direction of said image pickup apparatus and the second end that is one end of the second direction of said image pickup apparatus, the center of the third direction of said battery portion is closer to a third end on the opposite side to said first end of said image pickup apparatus, a lengthwise direction of said battery portion is approximately parallel to said third direction and the widthwise direction is approximately parallel to said first direction when seen from the top or the bottom of the image pickup apparatus, the lengthwise direction of said battery portion is approximately parallel to said second direction and a widthwise direction is approximately parallel to said first direction when seen from the left side or the right side of said image pickup apparatus, an end of said third direction of said display screen on said third end side is closer to said third end than the center of said third direction of said image pickup apparatus, said first optical system and said second optical system are disposed in the place not to overlap said battery portion in said first direction of said image pickup apparatus, and in a place to overlap said image display screen in said first direction of said image pickup apparatus, said first direction is a direction from the front side to the rear side of said image pickup apparatus or a direction from said rear side to said front side, said second direction is a direction from the top side to the bottom side of said image pickup apparatus or a direction from said bottom side to said top side, and said third direction is a direction from the left side to the right side of said image pickup apparatus or a direction from said right side to said left side.

2. An image pickup apparatus according to claim 1, wherein said first optical system is a prism.

3. An image pickup apparatus according to claim 2,
wherein the center of said third direction of said display screen is on the side of said first end,
the side on the side of said first end of said display screen is closer to said first end than the center of said third direction of said first optical system and the center of the third direction of said second optical system.

4. An image pickup apparatus according to claim 2,
wherein the center of said third direction of said display screen is on the side of the first end,
the side on the side of said first end of said display screen is closer to said first end than the center of said third direction of said first optical system and the center of the third direction of said second optical system.

5. An image pickup apparatus according to claim 1, further comprising:
memory store portion in which a memory which is attachable or detachable is stored;
wherein said first optical system and said second optical system is are disposed in the place not to overlap said memory store portion in said first direction of said image pickup apparatus, said memory store portion is disposed in the place to overlap said battery portion in said first direction of said image pickup apparatus and in the place not to overlap said battery portion in said second direction of said image pickup apparatus, and the lengthwise direction of said memory store portion is approximately parallel to said third direction and the widthwise length is approximately parallel to said first direction when seen from the top or the bottom of the image pickup apparatus, and the lengthwise direction of said memory store portion is approximately parallel to said second direction and the widthwise direction is approximately parallel to said first direction when seen from the left side of the right side of said image pickup apparatus.

6. An image pickup apparatus according to claim 5,
wherein the center of said third direction of said display screen is on the side of the first end,
the side on the side of said first end of said display screen is closer to said first end than the center of said third direction of said first optical system and the center of the third direction of said second optical system.

7. An image pickup apparatus according to claim 1,
wherein the center of said third direction of said display screen is on the side of said first end,
the side on the side of said first end of said display screen is closer to said first end than the center of said third direction of said first optical system and the center of the third direction of said second optical system.

8. An image pickup apparatus according to claim 1, wherein said second optical system is used for adjusting the focus.

* * * * *

UNITED STATES PATENT AND TRADEMARK OFFICE
CERTIFICATE OF CORRECTION

PATENT NO.        : 7,092,030 B1  
APPLICATION NO. : 09/143468  
DATED             : August 15, 2006  
INVENTOR(S)       : Takeshi Abe et al.

It is certified that error appears in the above-identified patent and that said Letters Patent is hereby corrected as shown below:

Column 16, line 8, delete "system is are disposed" and insert --system are disposed--

Signed and Sealed this

Twenty-first Day of November, 2006

JON W. DUDAS  
*Director of the United States Patent and Trademark Office*